US012793909B2

(12) United States Patent
Kim

(10) Patent No.: US 12,793,909 B2
(45) Date of Patent: Nov. 10, 2026

(54) ARC EXTINGUISHING UNIT AND AIR CIRCUIT BREAKER COMPRISING SAME

(71) Applicant: LS ELECTRIC CO., LTD., Anyang-si (KR)

(72) Inventor: Il Hyun Kim, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 581 days.

(21) Appl. No.: 18/280,618

(22) PCT Filed: Apr. 20, 2022

(86) PCT No.: PCT/KR2022/005792
§ 371 (c)(1),
(2) Date: Mar. 1, 2024

(87) PCT Pub. No.: WO2022/234990
PCT Pub. Date: Nov. 10, 2022

(65) Prior Publication Data

US 2025/0322997 A1 Oct. 16, 2025

(30) Foreign Application Priority Data

May 6, 2021 (KR) ........................ 10-2021-0058705

(51) Int. Cl.
*H01H 9/34* (2006.01)
*H01H 9/44* (2006.01)
(Continued)

(52) U.S. Cl.
CPC ............ *H01H 9/443* (2013.01); *H01H 9/346* (2013.01); *H01H 71/0235* (2013.01); *H01H 73/06* (2013.01)

(58) Field of Classification Search
CPC .......... H01H 9/443; H01H 9/346; H01H 9/46; H01H 9/44; H01H 33/08; H01H 33/182;
(Continued)

(56) References Cited

U.S. PATENT DOCUMENTS

| | | | | |
|---|---|---|---|---|
| 8,853,586 | B2 * | 10/2014 | Theisen | H01H 9/46 335/14 |
| 9,082,571 | B2 * | 7/2015 | Seo | H01H 33/08 |
| 9,343,251 | B2 * | 5/2016 | Juds | H01H 9/443 |
| 9,431,197 | B2 * | 8/2016 | Engewald | H01H 33/182 |

(Continued)

FOREIGN PATENT DOCUMENTS

| | | | | |
|---|---|---|---|---|
| CN | 205282331 U | | 6/2016 | |
| CN | 207319963 U | * | 5/2018 | H01H 73/04 |

(Continued)

OTHER PUBLICATIONS

Translation of KR20180048151 (Original document published May 10, 2018) (Year: 2018).*

(Continued)

*Primary Examiner* — William A Bolton
(74) *Attorney, Agent, or Firm* — K&L Gates LLP

(57) ABSTRACT

Disclosed are an arc extinguishing unit and an air circuit breaker comprising the same. An arc extinguishing unit according to an embodiment of the present invention provides: side plates spaced apart from each other and disposed to face each other; a plurality of grids disposed between the side plates, spaced apart from each other, and coupled to the side plates, respectively; a magnet unit forming a magnetic field for changing a path of an arc formed between a fixed contact and a movable contact disposed to be spaced apart from the fixed contact, and disposed adjacent to the outermost grid adjacent to the fixed contact among the plurality of grids.

14 Claims, 25 Drawing Sheets

(51) Int. Cl.
*H01H 71/02* (2006.01)
*H01H 73/06* (2006.01)

(58) Field of Classification Search
CPC .... H01H 33/18; H01H 33/185; H01H 31/023; H01H 31/04; H01H 71/0235; H01H 73/18
USPC .......................................... 218/22-26, 34, 38
See application file for complete search history.

(56) References Cited

U.S. PATENT DOCUMENTS

| | | | | |
|---|---|---|---|---|
| 9,673,004 B1 * | 6/2017 | Ruempler | ................ | H01H 9/36 |
| 10,811,207 B2 * | 10/2020 | Lim | ........................ | H01H 9/362 |
| 10,957,504 B1 * | 3/2021 | Shea | ........................ | H01H 9/36 |
| 2013/0284702 A1 * | 10/2013 | Hamada | ................. | H01H 9/346<br>218/26 |
| 2022/0208488 A1 | 6/2022 | Kim | | |

FOREIGN PATENT DOCUMENTS

| | | | | | |
|---|---|---|---|---|---|
| CN | 109166774 A | * | 1/2019 | ............. | H01H 73/04 |
| JP | 2011129385 A | | 6/2011 | | |
| KR | 20020069727 A | | 9/2002 | | |
| KR | 20050011921 A | | 1/2005 | | |
| KR | 20160019757 A | | 2/2016 | | |
| KR | 20180048151 A | | 5/2018 | | |
| KR | 20200078061 A | | 7/2020 | | |
| KR | 20210007390 A | | 1/2021 | | |
| WO | 2020204388 A1 | | 10/2020 | | |

OTHER PUBLICATIONS

Translation of CN207319963 (Original document published May 4, 2018) (Year: 2018).*
Translation of CN109166774 (original document published Jan. 8, 2019) (Year: 2019).*
Office Action for related Korean Application No. 10-2021-0058705; action dated Sep. 26, 2023; (4 pages).
Extended European Search Report for related European Application No. 22799035.5; action dated May 14, 2025; (11 pages).
International Search Report for related International Application No. PCT/KR2022/005792; action dated Nov. 10, 2022; (3 pages).
Written Opinion for related International Application No. PCT/KR2022/005792; action dated Nov. 10, 2022; (3 pages).

* cited by examiner

ARC EXTINGUISHING UNIT AND AIR CIRCUIT BREAKER COMPRISING SAME

CROSS-REFERENCE TO RELATED APPLICATION

This application is a National Stage of International Application No. PCT/KR2022/005792, filed on Apr. 22, 2022, which claims priority to and the benefit of Korean Patent Application No. 10-2021-0058705, filed on May 6, 2021, the disclosure of which is incorporated herein by reference in its entirety.

FIELD

The present disclosure relates to an arc extinguishing unit and an air circuit breaker including the same, and more particularly, to an arc extinguishing unit capable of effectively extinguishing an arc generated by breaking an electric current and an air circuit breaker including the same.

BACKGROUND

A circuit breaker refers to a device capable of allowing or blocking energization with the outside by contacting and separating fixed contacts and movable contacts. A fixed contact and a movable contact provided in the circuit breaker are respectively connected energizably to an external power source or load.

The movable contact is movably provided in the circuit breaker. The movable contact can be moved towards or away from the fixed contact. When the movable contact and the fixed contact come into contact to each other, the circuit breaker may be energizably connected to an external power source or load.

When an overcurrent or abnormal current flows in the circuit breaker, the movable contact and the fixed contact in contact are spaced apart from each other. At this time, the current energized between the movable contact and the fixed contact does not immediately disappear, but changes into an arc form and extends along the movable contact.

An arc can be defined as a flow of electrons at high temperature and high pressure. Therefore, when the generated arc stays in the inner space of the circuit breaker for a long time, there is a concern that each component of the circuit breaker may be damaged. In addition, when the arc is discharged to the outside of the circuit breaker without a separate treatment process, there is a risk of injury to the user.

Accordingly, circuit breakers are generally provided with an extinguishing device for extinguishing and discharging an arc. The generated arc passes through the extinguishing device, the arc pressure is increased, the moving speed is increased, and it is cooled at the same time and can be discharged to the outside.

Therefore, the generated arc must be quickly guided to an arc extinguishing device.

However, in the case of a direct current air circuit breaker in which a small current flows among DC air breakers, the power of the generated arc is relatively weak. In addition, in the case of direct current, because zero point does not exist in the current, arc extinguishing is more difficult than that of alternating current.

In particular, since the power of the arc generated inside the DC air circuit breaker is relatively weak when a small current is broken, there is a problem in that the arc generated after the break is not moved to the grid of the arc extinguishing unit. The arc that has not been extinguished in this way stays adjacent to the movable contact and the fixed contact, causing problems such as melting the contact.

Therefore, it is necessary to consider effectively extinguishing the arc generated when the small current is broken in the DC air circuit breaker.

SUMMARY

The present disclosure is directed to providing an arc extinguishing unit having a structure capable of solving the above problems and an air circuit breaker including the same.

First, the present disclosure is directed to providing an arc extinguishing unit having a structure capable of quickly extinguishing and moving a generated arc and an air circuit breaker including the same.

In addition, the present disclosure is directed to providing an arc extinguishing unit having a structure in which an arc generated when a small current is broken in a direct current air circuit breaker can quickly move to a grid and be extinguished, and an air circuit breaker including the same.

In addition, the present disclosure is directed to providing an arc extinguishing unit having a structure in which a magnet forming a magnetic field associated with an arc movement path is not damaged by an arc, and an air circuit breaker including the same.

In addition, the present disclosure is directed to providing an arc extinguishing unit having a structure that does not require excessive design changes in order to have a magnet that forms a magnetic field associated with an arc movement path, and an air circuit breaker including the same.

In addition, the present disclosure is directed to providing an arc extinguishing unit having a structure in which even when a magnet forming a magnetic field associated with an arc movement path is provided, a space occupied by the magnetic body is not excessively increased, and an air circuit breaker including the same.

In addition, the present disclosure is directed to providing an arc extinguishing unit having a structure in which a magnetic field formed by each magnet can be strengthened when a plurality of magnets forming a magnetic field associated with an arc movement path, and an air circuit breaker including the same.

In addition, the present disclosure is directed to providing an arc extinguishing unit having a structure in which an arc extinguishing path of a generated arc can be secured even when a magnet is provided, and an air circuit breaker including the same.

In order to achieve the above objects, the present disclosure provides an arc extinguishing unit, including: side plates spaced apart from each other and disposed to face each other; a plurality of grids disposed between the side plates, spaced apart from each other, and coupled to the side plates, respectively; and a magnet unit forming a magnetic field for changing a path of an arc formed between a fixed contact and a movable contact disposed to be spaced apart from the fixed contact, and disposed adjacent to the outermost grid adjacent to the fixed contact among the plurality of grids.

In addition, the magnet unit may include a magnet unit disposed to be symmetrical with respect to a central portion of the grid disposed between the one side plate and the other side plate.

In addition, the magnet unit may be disposed on at least one of the grid and the side plate.

In addition, the magnet unit may include a case formed to define a storage part therein and coupled to the grid or the side plate; and a magnetic body accommodated in the storage part and configured to form a magnetic field.

In addition, the magnet unit may further include an insulator accommodated in the storage part and formed to surround the magnetic body.

In addition, the case may guide an arc such that an arc generated flows toward the grid.

In addition, the magnet unit may include a first magnet unit coupled to the side plate and extending in a direction in which the plurality of grids coupled to the side plate are aligned; and a second magnet unit coupled to the side plate facing the side plate to which the first magnet unit is coupled and disposed at a position corresponding to the first magnet unit.

In addition, the magnet unit may further include a third magnet unit coupled to any one of the plurality of grids.

In addition, the third magnet unit may include a case formed to define a storage part therein and coupled to the grid or the side plate; a magnetic body accommodated in the storage part and configured to form a magnetic field; and a coupling member for coupling the case to a coupling groove formed in the grid.

In addition, the case may include a first case having a storage part capable of accommodating the magnetic body on a rear surface, and a second case coupled to the first case through the coupling member on the rear surface of the first case, and the first case may include a protruding portion formed at a bottom of a front surface to be in contact with a bottom of a grid.

In addition, wing portions may protrude from opposite sides of the rear surface of the first case in the up and down direction, and the second case may be inserted and fixed between the wing portions.

In addition, the magnetic body of the first magnet unit and the second magnet unit may include a first surface magnetized to the N pole, and a second surface magnetized to the S pole, and the first surface may be disposed along a direction in which the first magnet unit and the second magnet unit are away from each other.

In addition, the magnetic body of the third magnet unit may include a first surface magnetized to the N pole, and a second surface magnetized to the S pole, and the first surface may be disposed toward a space through which the movable contact passes when the fixed contact and the movable contact are separated from each other.

In addition, the third magnet unit may be coupled to the outermost grid.

In addition, a coupling leg protruding downward from a lower end of the center of the outermost grid may be formed in the outermost grid.

In addition, the outermost grid may further include a grid leg formed to be spaced apart from opposite sides of the coupling leg, and protruding downward.

A concave groove may be formed between the grid leg and the coupling leg.

In addition, in order to achieve the above objects, the present disclosure provides an air circuit breaker, including: a fixed contact; a movable contact moved in a direction toward or away from the fixed contact; and an arc extinguishing unit positioned adjacent to the fixed contact and the movable contact, and configured to extinguish an arc generated when the fixed contact and the movable contact are spaced apart, wherein the arc extinguishing unit may include side plates spaced apart from each other and disposed to face each other; a plurality of grids disposed between the side plates, spaced apart from each other, and coupled to the side plates, respectively; and a magnet unit forming a magnetic field for changing a path of an arc formed between a fixed contact and a movable contact disposed to be spaced apart from the fixed contact, and disposed adjacent to the outermost grid adjacent to the fixed contact among the plurality of grids.

In addition, the air circuit breaker may further include a low runner protruding upward from the fixed contact, and a protruding contact protruding upward from the movable contact, and contacting the low runner when the movable contact comes to contact with the fixed contact.

According to embodiments of the present disclosure, the following effects can be achieved.

An arc-guided path A.P is formed by Fleming's left-hand rule, by the direction of the magnetic field of which an arc caused by a small current formed under the grid of the arc extinguishing unit according to an embodiment of the present disclosure is applied to a magnetic field M.F of a magnetic field area M.F.A formed by the first magnet unit to third magnet unit.

The arc is moved along the arc-guided path A.P. As the arc is moved, the arc is quickly applied to the grid, so there is an effect that it can be quickly extinguished.

Furthermore, according to the arc extinguishing unit according to an embodiment of the present disclosure, by the magnetic field of the third magnet unit, the arc is moved to the left or right in each case where the arc is formed in a direction of entering toward or out of the paper.

By the way, since the magnetic fields of the first magnet unit and the second magnet unit are formed in opposite directions to each other, in both cases where the direction of the arc formed in the arc extinguishing unit is formed in a direction of entering toward the paper or in a direction of coming out of the paper, there is an advantage in that an arc-guided path A.P is formed in the upward direction.

In addition, according to an embodiment of the present disclosure, by providing the low runner and the protruding contact, there is an effect that the location where the arc is generated is moved upward. That is, according to an embodiment of the present disclosure, there is an effect that an area where an arc is generated is moved upward by a distance in which the protruding contact protrudes upward from the movable contact.

Accordingly, since the magnetic field applied to the arc by the first magnet unit, the second magnet unit, and the third magnet unit increases, the electromagnetic force at which the arc is moved upward can be more strongly applied.

In addition, since the distance between the generated arc and the grid decreases, the time at which the arc is applied to the grid decreases, and thus the arc can be quickly extinguished.

DETAILED DESCRIPTION

Hereinafter, a circuit breaking unit and an air circuit breaker including the same according to an embodiment of the present disclosure will be described in detail with reference to the accompanying drawings.

In the following description, in order to clarify the features of the present disclosure, descriptions of some components may be omitted.

1. Term Definition

The term “energization” used in the following description means that a current or an electrical signal is transmitted between one or more members.

The term “magnet” used in the following description refers to any object capable of magnetizing a magnetic body or generating a magnetic field. In an embodiment, the magnet may be provided as a permanent magnet or an electromagnet.

The term “air circuit breaker” used in the following description refers to a circuit breaker configured to extinguish an arc using air or compressed air. It is assumed that each configuration described below is applied to an air circuit breaker.

However, each configuration described below may also be applied to an air-blast circuit breaker, a compressed air circuit breaker, a gas circuit breaker, an oil circuit breaker, a vacuum circuit breaker, and the like.

The term “magnetic field (M.F)” used in the following description means a magnetic field formed by a magnet. Alternatively, it means a magnetic field formed by a plurality of magnets disposed adjacent to each other. That is, the magnetic field (M.F) means a magnetic field formed by one magnet or a plurality of magnets.

The term “magnetic field area (M.F.A)” means an area of a magnetic field formed by a magnet. In particular, it means a place where a magnetic field formed by a magnet affects a section where an arc is generated.

The “arc-generation area (A.A)” means an area where an arc is generated. In particular, it refers to an area where the movable contact and the fixed contact are spaced apart and where an arc is likely to occur.

The “arc-guided path (A.P)” means a direction of an electromagnetic force received by an arc generated by a magnet unit according to an embodiment of the present disclosure by a Lorentz force. The path of the arc may be guided by the electromagnetic force generated by the Lorentz force.

Figure 1:
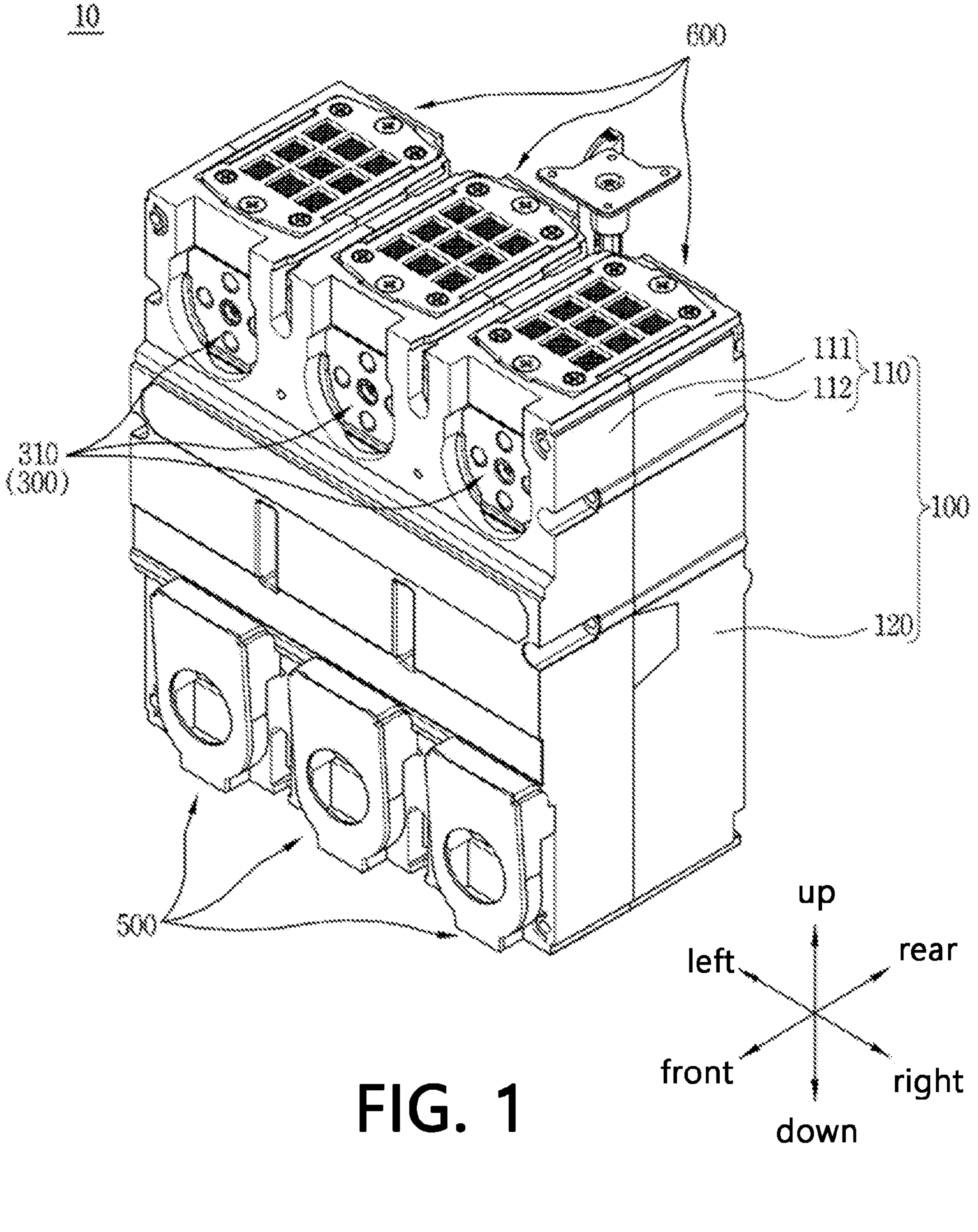
FIG. 1 is a perspective view of an air circuit breaker according to an exemplary embodiment of the present disclosure.
Figure 2:
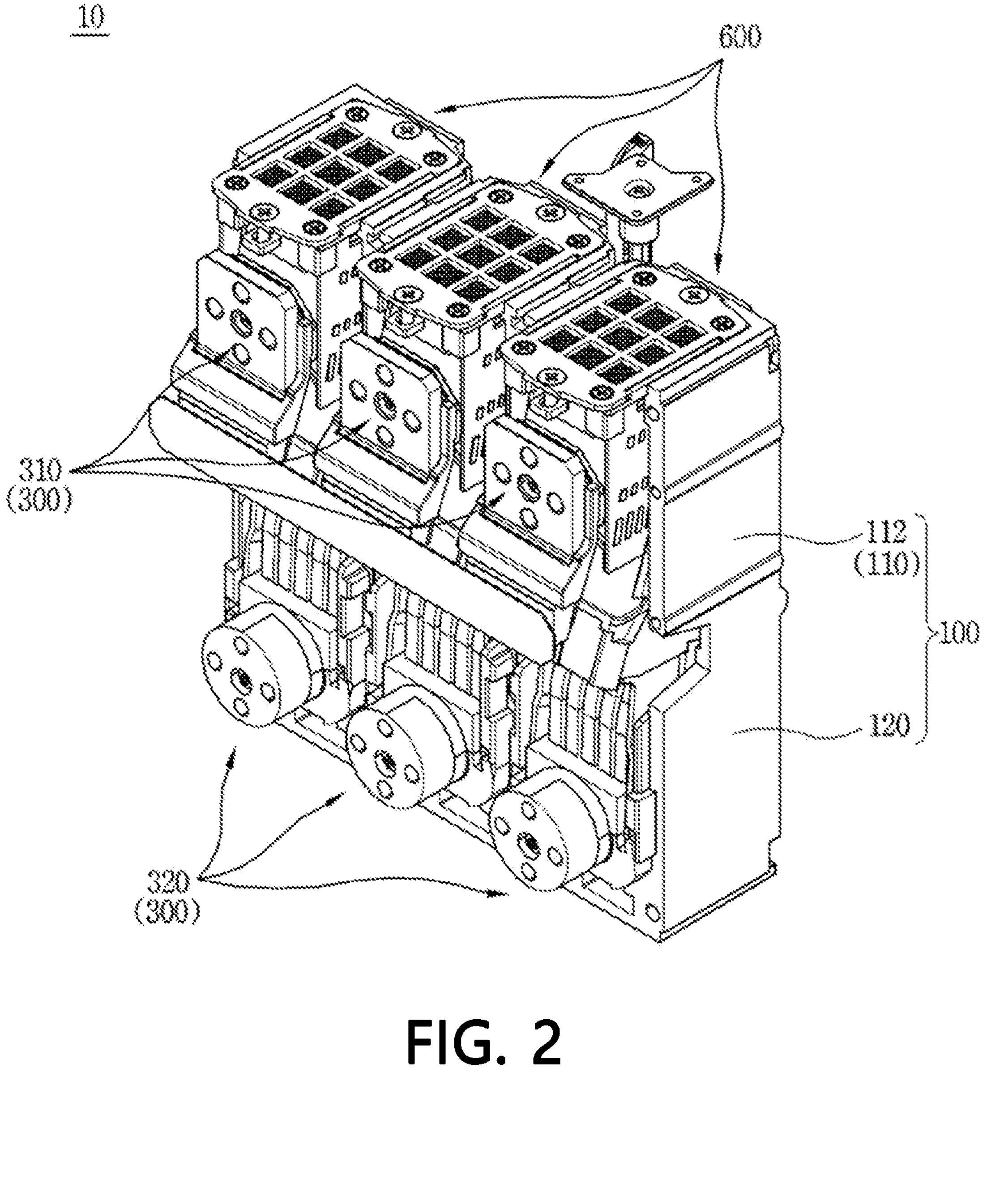
FIG. 2 is a perspective view illustrating a state in which a rear cover is removed from the air circuit breaker of FIG. 1.
Figure 3:
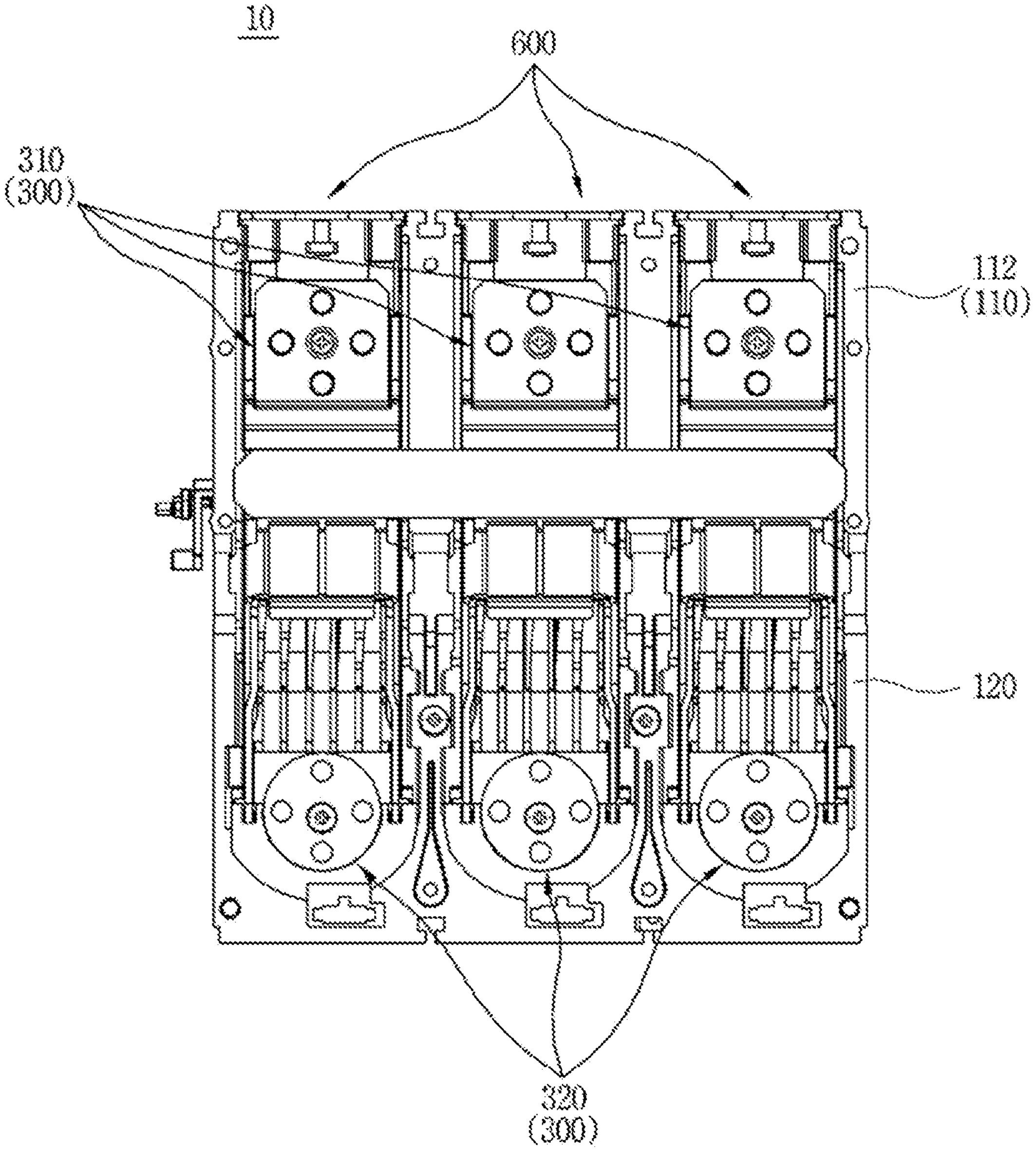
FIG. 3 is a front view illustrating a state in which a rear cover is removed from the air circuit breaker of FIG. 1.
Figure 4:
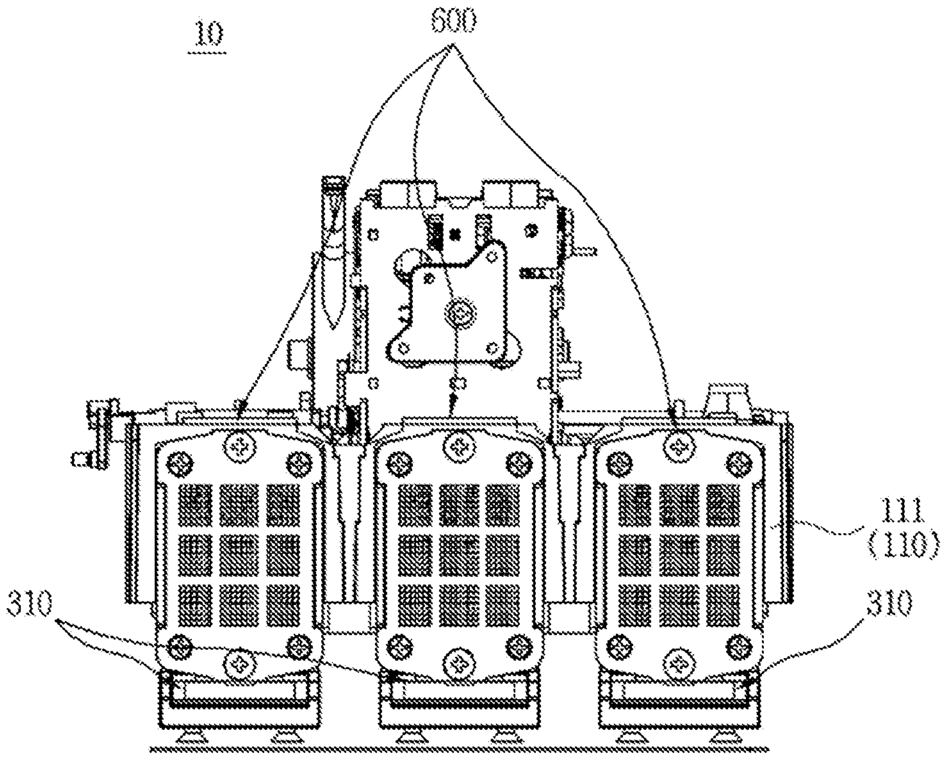
FIG. 4 is a plan view illustrating a state in which a rear cover is removed from the air circuit breaker of FIG. 1.
Figure 5:
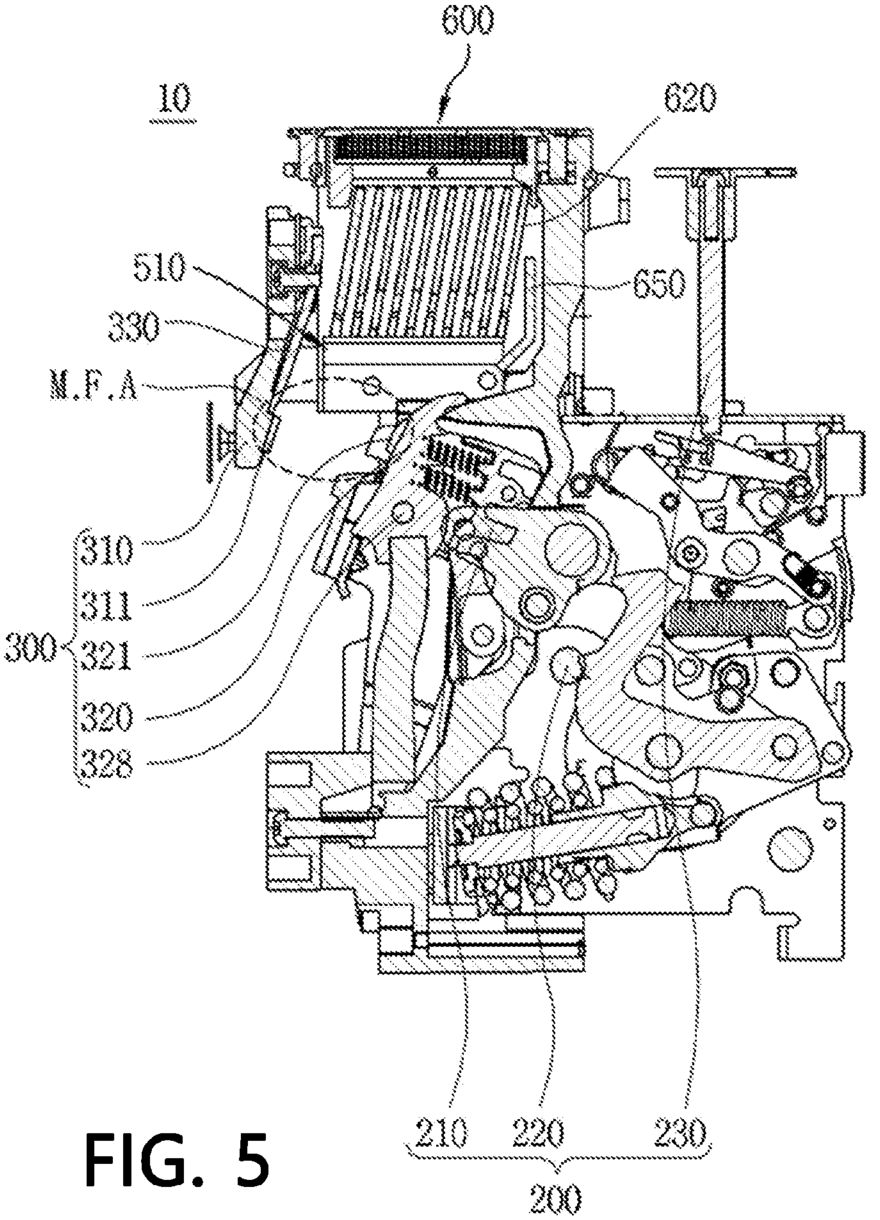
FIG. 5 is a cross-sectional view illustrating a state in which a rear cover is removed from the air circuit breaker of FIG. 1.

The terms “upper side or above”, “lower side or below”, “left side”, “right side”, “front side”, and “rear side” used in the following description will be understood with reference to the coordinate system shown in FIG. 1.

2. Description of a Configuration of an Air Circuit Breaker 10 According to an Embodiment of the Present Disclosure Referring to FIGS. 1 to 5, the air circuit breaker 10 according to an embodiment of the present disclosure includes a cover unit 100, a driving unit 200, a circuit breaking unit 300, and an arc extinguishing unit 600.

(1) Description of the Cover Unit 100

Referring to FIGS. 1 to 5, the air circuit breaker 10 according to an embodiment of the present disclosure includes a cover unit 100.

The cover unit 100 forms the outer shape of the air circuit breaker 10. In addition, a space is formed inside the cover unit 100, and each component for operating the air circuit breaker 10 can be mounted in the space.

That is, the cover unit 100 functions as a kind of housing.

The cover unit 100 may be formed of a material with high heat resistance and high rigidity. This is to prevent damage to each component mounted inside and to prevent damage caused by an arc generated inside. In an embodiment, the cover unit 100 may be formed of synthetic resin or reinforced plastic.

In the illustrated embodiment, the cover unit 100 has a quadrangular pillar shape with a height in the up and down direction. The shape of the cover unit 100 may be provided in any shape capable of mounting components for operating the air circuit breaker 10 therein.

The inner space of the cover unit 100 is energized to the outside. Each component mounted inside the cover unit 100 may be energizably connected to an external power source or load.

In the illustrated embodiment, the cover unit 100 includes an upper cover 110 and a lower cover 120.

The upper cover 110 forms the upper side of the cover unit 100. The upper cover 110 is positioned above the lower cover 120. In an embodiment, the upper cover 110 and the lower cover 120 may be integrally formed.

A space is formed inside the upper cover 110. Various components provided in the air circuit breaker 10 are mounted in the space. In an embodiment, the circuit breaking unit 300, the arc extinguishing unit 600, and the like may be mounted in the inner space of the upper cover 110.

The inner space of the upper cover 110 communicates with the inner space of the lower cover 120. Components such as the circuit breaking unit 300 may be accommodated throughout the inner space of the upper cover 110 and the inner space of the lower cover 120.

The arc extinguishing unit 600 is located on one side of the upper cover 110, i.e., on the upper surface in the illustrated embodiment. The arc extinguishing unit 600 may be partially exposed on the upper surface of the upper cover 110. The arc generated in the inner space of the upper cover 110 may pass through the arc extinguishing unit 600 and may be extinguished and discharged to the outside of the air circuit breaker 10.

On the other side of the upper cover 110, i.e., the front side in the illustrated embodiment, a fixed contact terminal 310 of the circuit breaking unit 300 is exposed. The fixed contact terminal 310 may be energizably connected to an external power source or load through the exposed portion.

In the illustrated embodiment, the upper cover 110 includes a first upper cover 111 and a second upper cover 112.

The first upper cover 111 is configured to cover one side of the upper side of the air circuit breaker 10, i.e., the front side in the illustrated embodiment. The first upper cover 111 is coupled to the second upper cover 112 by any fastening means.

An opening is formed in the first upper cover 111. The fixed contact terminal 310 may be exposed to the outside through the opening. In the illustrated embodiment, three of said openings are formed in the left-right direction.

The second upper cover 112 is configured to cover the other side of the upper side of the air circuit breaker 10, i.e., the rear side in the illustrated embodiment. The second upper cover 112 is coupled to the first upper cover 111 by any fastening means.

The lower cover 120 forms the lower side of the cover unit 100. The lower cover 120 is positioned below the upper cover 110.

A space is formed inside the lower cover 120. Various components provided in the air circuit breaker 10 are mounted in the space. In an embodiment, the driving unit 200, the circuit breaking unit 300, and the like may be mounted in the inner space of the lower cover 120.

The inner space of the lower cover 120 communicates with the inner space of the upper cover 110. Components such as the circuit breaking unit 300 may be accommodated throughout the inner space of the lower cover 120 and the inner space of the upper cover 110.

On one side of the lower cover 120, i.e., the front side in the illustrated embodiment, a movable contact terminal 320 of the circuit breaking unit 300 is located. The movable contact terminal 320 may be exposed to the outside through an opening formed in the lower cover 120. The movable contact terminal 320 may be energizably connected to an external power source or load through the exposed portion.

(2) Description of the Driving Unit 200

Referring to FIGS. 1 to 5, the air circuit breaker 10 according to an embodiment of the present disclosure includes a driving unit 200.

The driving unit 200 is rotated as the fixed contact 311 and the movable contact 321 of the circuit breaking unit 300 are spaced apart, thereby performing a trip mechanism. Accordingly, the air circuit breaker 10 may break energization with the outside, and the user can recognize that an operation to break energization has been performed.

The driving unit 200 is accommodated inside the air circuit breaker 10. Specifically, the driving unit 200 is partially accommodated in a space inside the cover unit 100. In addition, the remaining portion of the driving unit 200 is accommodated inside a case provided on one side (the rear side in the illustrated embodiment) of the cover unit 100, which is not given with reference numerals.

The driving unit 200 is connected to the circuit breaking unit 300. Specifically, a crossbar 220 of the driving unit 200 is configured to rotate together with the rotation of the movable contact terminal 320 of the circuit breaking unit 300.

Therefore, when the movable contact terminal 320 of the circuit breaking unit 300 is rotated and moved, the driving unit 200 may be rotated together. The driving unit 200 is rotatably accommodated inside the air circuit breaker 10.

In the illustrated embodiment, the driving unit 200 includes a shooter 210, a crossbar 220 and a lever 230.

The shooter 210 is rotated together as the movable contact terminal 320 of the circuit breaking unit 300 is rotated away from the fixed contact terminal 310. The shooter 210 is connected to the crossbar 220 and the lever 230.

Specifically, one end of the shooter 210 is restrained by the crossbar 220. An elastic member is provided at the other end of the shooter 210. Accordingly, in a state in which the fixed contact 311 and the movable contact 321 are in contact, the shooter 210 presses the elastic member and stores restoring force. The external force for the pressing may be provided by a state in which the crossbar 220 is rotated toward the fixed contact terminal 310.

When the movable contact 321 is spaced apart from the fixed contact 311, the movable contact terminal 320 is rotated in a direction away from the fixed contact terminal 310. Accordingly, the crossbar 220 is also rotated, and one end of the shooter 210 is released and rotated by the restoring force provided by the elastic member.

The shooter 210 is connected to the lever 230. As the shooter 210 is rotated and strikes the lever 230, the lever 230 may be also rotated and a trip mechanism may be performed.

The crossbar 220 is connected to the movable contact terminal 320 and is rotated together as the movable contact terminal 320 is rotated. Accordingly, the shooter 210 restrained by the crossbar 220 may be released and a trip mechanism may be performed.

The crossbar 220 may extend between the plurality of circuit breaking units 300. In the illustrated embodiment, a total of three movable contact terminals 320 of the circuit breaking unit 300 are provided and disposed in the left-right direction. The crossbar 220 may be connected through the plurality of movable contact terminals 320 disposed in the left-right direction.

The crossbar 220 contacts the one end of the shooter 210 to restrain the shooter 210. When the crossbar 220 is rotated together with the movable contact terminal 320, the crossbar 220 releases the one end of the shooter 210.

The lever 230 may be hit and rotated by the rotating shooter 210. The lever 230 may be partially exposed to the outside of the air circuit breaker 10. When the trip mechanism is performed by the circuit breaking unit 300, the lever 230 is rotated in a preset direction.

Accordingly, the user can easily recognize that the trip mechanism has been performed. In addition, the user can rotate the lever 230 to adjust the air circuit breaker 10 to a state in which it can be energized again.

The process of performing the trip mechanism by the driving unit 200 is a well-known technique, and thus a detailed description thereof will be omitted.

(3) Description of the Circuit Breaking Unit 300

Referring to FIGS. 1 to 5, the air circuit breaker 10 according to an embodiment of the present disclosure includes a circuit breaking unit 300.

The circuit breaking unit 300 includes a fixed contact terminal 310 and a movable contact terminal 320 spaced apart from each other or in contact with each other. When the fixed contact terminal 310 and the movable contact terminal 320 are in contact with each other, the air circuit breaker 10 may be energized with an external power source or load. When the fixed contact terminal 310 and the movable contact terminal 320 are spaced apart from each other, the air circuit breaker 10 is de-energized from an external power source or load.

The circuit breaking unit 300 is accommodated inside the air circuit breaker 10. Specifically, the circuit breaking unit 300 is rotatably accommodated in the inner space of the cover unit 100.

The circuit breaking unit 300 may be energized with the outside. In an embodiment, current from an external power source or load may flow into any one of the fixed contact terminal 310 and the movable contact terminal 320. In addition, current may flow from the other one of the fixed contact terminal 310 and the movable contact terminal 320 to an external power source or load.

The circuit breaking unit 300 may be partially exposed to the outside of the air circuit breaker 10. Accordingly, the circuit breaking unit 300 may be energizably connected to an external power source or load through a member such as a conducting wire (not shown).

A plurality of circuit breaking units 300 may be provided. The plurality of circuit breaking units 300 may be disposed to be spaced apart from each other in one direction. A partition wall may be provided between each of the circuit breaking units 300 to prevent interference between currents energized to each of the circuit breaking units 300.

In the illustrated embodiment, three circuit breaking units 300 are provided. In addition, the three circuit breaking units 300 are disposed to be spaced apart from each other in the left-right direction of the air circuit breaker 10. This is because the air circuit breaker 10 according to an embodiment of the present disclosure is energized with three-phase currents such as R phase, S phase and T phase or U phase, V phase and W phase.

The number of circuit breaking units 300 may be changed according to the number of phases of current flowing through the air circuit breaker 10.

In the illustrated embodiment, the circuit breaking unit 300 includes a fixed contact terminal 310 and a movable contact terminal 320.

The fixed contact terminal 310 may be in contact with or spaced apart from the movable contact terminal 320. When the movable contact terminal 310 contacts the fixed contact terminal 320, the air circuit breaker 10 may be energized with an external power source or load. When the fixed contact terminal 310 and the movable contact terminal 320 are spaced apart from each other, the air circuit breaker 10 is de-energized from an external power source or load.

As can be seen from the name, the fixed contact terminal 310 is fixedly installed on the cover unit 100. Thus, the contact and separation of the fixed contact terminal 310 and the movable contact terminal 320 are achieved by the rotation of the movable contact terminal 320.

In the illustrated embodiment, the fixed contact terminal 310 is accommodated in the inner space of the upper cover 110.

The fixed contact terminal 310 may be partially exposed to the outside of the air circuit breaker 10. Through the exposed portion, the fixed contact terminal 310 may be energizably connected to an external power source or load.

In the illustrated embodiment, the fixed contact terminal 310 is exposed to the outside through an opening formed on the front side of the upper cover 110.

The fixed contact terminal 310 may be formed of a material having electrical conductivity. In an embodiment, the fixed contact terminal 310 may be formed of copper (Cu) or iron (Fe) and an alloy material including the same.

In the illustrated embodiment, the fixed contact terminal 310 includes a fixed contact 311.

The fixed contact 311 may be in contact with or spaced apart from the movable contact 321. The fixed contact 311 is located on one side of the fixed contact terminal 310 towards the movable contact terminal 320, i.e., on the rear side in the illustrated embodiment.

The fixed contact 311 is energized with the fixed contact terminal 310. In the illustrated embodiment, the fixed contact 311 is located on the rear side of the fixed contact terminal 310. In an embodiment, the fixed contact 311 may be integrally formed with the fixed contact terminal 310.

When the fixed contact 311 and the movable contact 321 are in contact with each other, the air circuit breaker 10 is energizably connected to an external power source or load. In addition, when the fixed contact 311 is spaced apart from the movable contact 321, the air circuit breaker 10 is de-energized from an external power source or load.

A low runner 330 may protrude above the fixed contact terminal 310. The low runner 330 may extend upward toward the arc extinguishing unit 600. When the fixed contact terminal 310 and the movable contact terminal 320 are in contact with each other, the low runner 330 may be energized by contact with a protruding contact 322 to be described later.

The low runner 330 may serve to guide an arc generated when the fixed contact terminal 310 and the movable contact terminal 320 are separated from each other and transfer it to a grid 620. To this end, the low runner 330 may be formed of a magnetic material having magnetism. This is to apply an attractive force to the arc, which is a flow of electrons.

In addition, as the low runner 330 and the protruding contact 322 are spaced apart from a state in which they are in contact with each other, an arc may occur between the low runner 330 and the protruding contact 322. This will be described in detail later.

The movable contact terminal 320 may be in contact with or spaced apart from the fixed contact terminal 310. It is as described above that the air circuit breaker 10 can be energized or de-energized from an external power source or load by contact and separation between the movable contact terminal 320 and the fixed contact terminal 310.

The movable contact terminal 320 is rotatably installed in the inner space of the cover unit 100. The movable contact terminal 320 may be rotated in a direction toward the fixed contact terminal 310 and in a direction away from the fixed contact terminal 310.

In the illustrated embodiment, the movable contact terminal 320 is accommodated in the inner spaces of the upper cover 110 and the lower cover 120. It is as described above that the inner spaces of the upper cover 110 and the lower cover 120 may communicate with each other.

The movable contact terminal 320 may be partially exposed to the outside of the air circuit breaker 10. Through the exposed portion, the movable contact terminal 320 may be energizably connected to an external power source or load.

In the illustrated embodiment, the movable contact terminal 320 is exposed to the outside through an opening formed on the front side of the lower cover 120.

The movable contact terminal 320 may be formed of a material having electrical conductivity. In an embodiment, the movable contact terminal 320 may be formed of copper or iron and an alloy material including the same.

The movable contact terminal 320 is connected to the driving unit 200. Specifically, the movable contact terminal 320 is connected to the crossbar 220 of the driving unit 200. In an embodiment, the crossbar 220 may be coupled through the movable contact terminal 320.

When the movable contact terminal 320 is rotated, the crossbar 220 may also be rotated. Accordingly, it is as described above that the driving unit 200 is operated and the trip mechanism can be performed.

In the illustrated embodiment, the movable contact terminal 320 includes a movable contact 321 and a rotation shaft 328.

The movable contact 321 may be in contact with or spaced apart from the fixed contact 311. The movable contact 321 is located on one side of the movable contact terminal 320 towards the fixed contact terminal 310, i.e., on the front side in the illustrated embodiment.

The movable contact 321 may be rotated together with the movable contact terminal 320. When the movable contact terminal 320 is rotated toward the fixed contact terminal 310, the movable contact 321 may also be rotated toward the fixed contact 311 to contact the fixed contact 311.

In addition, when the movable contact terminal 320 is rotated in a direction away from the fixed contact terminal 310, the movable contact 321 may also be spaced apart from the fixed contact 311.

The movable contact 321 is energized with the movable contact terminal 320. In the illustrated embodiment, the movable contact 321 is located on the front side of the movable contact terminal 320. In an embodiment, the movable contact 321 may be integrally formed with the movable contact terminal 320.

It is as described above that the air circuit breaker 10 is energized or de-energized from an external power source or load by contact and separation between the movable contact 321 and the fixed contact 311.

When the fixed contact 311 and the movable contact 321 are spaced apart from each other in a state in which the fixed contact 311 and the movable contact 321 are brought into contact with each other and are energized, an arc is generated. The air circuit breaker 10 according to an embodiment of the present disclosure includes various components for effectively forming a path of an arc generated. This will be described later in detail.

The rotation shaft 328 is a portion where the movable contact terminal 320 is rotatably coupled to the cover unit 100. The movable contact terminal 320 may be rotated in a direction toward the fixed contact terminal 310 or in a direction away from the fixed contact terminal 310 about the rotation shaft 328.

The rotation shaft 328 is located on the other side of the movable contact terminal 320 opposite to the fixed contact terminal 310, i.e., on the rear side in the illustrated embodiment.

(4) Description of the Arc Extinguishing Unit 600

Referring to the drawings, the air circuit breaker 10 according to an embodiment of the present disclosure includes an arc extinguishing unit 600.

The arc extinguishing unit 600 is configured to extinguish an arc generated when the fixed contact 311 and the movable contact 321 are spaced apart. The generated arc may pass through the arc extinguishing unit 600 and be discharged to the outside of the air circuit breaker 10 after being extinguished and cooled.

The arc extinguishing unit 600 is coupled to the cover unit 100. One side of the arc extinguishing unit 600 for arc discharge may be exposed to the outside of the cover unit 100. In the illustrated embodiment, the upper side of the arc extinguishing unit 600 is exposed to the outside of the cover unit 100.

The arc extinguishing unit 600 is partially accommodated in the cover unit 100. The remaining portion of the arc extinguishing unit 600 except for the portion exposed to the outside may be accommodated in the inner space of the cover unit 100. In the illustrated embodiment, the arc extinguishing unit 600 is partially accommodated on the upper side of the upper cover 110.

The arrangement may be changed according to the position of the fixed contact 311 and the movable contact 312. That is, the arc extinguishing unit 600 may be positioned adjacent to the fixed contact 311 and the movable contact 312. Accordingly, an arc extending along the movable contact 312 rotated away from the fixed contact 311 may easily enter the arc extinguishing unit 600.

A plurality of arc extinguishing units 600 may be provided. The plurality of arc extinguishing units 600 may be disposed to be physically and electrically spaced apart from each other. In the illustrated embodiment, three arc extinguishing units 600 are provided.

That is, each arc extinguishing unit 600 is positioned adjacent to each fixed contact 311 and movable contact 321. In the illustrated embodiment, each arc extinguishing unit 600 is positioned adjacent to the upper side of each fixed contact 311 and movable contact 321.

It will be understood that each arc extinguishing unit 600 is configured to extinguish an arc generated when a current flowing through each circuit breaking unit 300 is broken.

The arc extinguishing units 600 may be disposed adjacent to each other. In the illustrated embodiment, the three arc extinguishing units 600 are disposed side by side in the left-right direction of the air circuit breaker 10.

In the illustrated embodiment, the arc extinguishing unit 600 includes a side plate 610, a grid 620, a grid cover 630, a magnet unit 500 and an arc runner 650.

Side plates 610 form both sides of arc extinguishing unit 600, i.e., right and left in the illustrated embodiment. The side plate 610 is coupled to each component of the arc extinguishing unit 600 and supports the components.

Specifically, the side plate 610 is coupled to the grid 620, the grid cover 630, the magnet unit 500 and the arc runner 650.

A plurality of side plates 610 are provided. The plurality of side plates 610 may be spaced apart from each other and disposed to face each other. In the illustrated embodiment, two side plates 610 are provided, forming the right and left sides of the arc extinguishing unit 600, respectively.

The side plate 610 may be formed of an insulating material. This is to prevent the generated arc from flowing toward the side plate 610.

The side plate 610 may be formed of a heat-resistant material. This is to prevent damage or shape deformation by the generated arc.

A plurality of through holes are formed in the side plate 610. The grid 620 and the arc runner 650 may be inserted and coupled to some of the through holes. In addition, fastening members for fastening the grid cover 630 and the magnet unit 500 to the side plate 610 may be coupled through some of the other through holes.

In the illustrated embodiment, the side plate 610 is provided in a plate shape having a plurality of edges formed at vertices. The side plate 610 may be provided in any shape capable of forming both sides of the arc extinguishing unit 600 and supporting each component of the arc extinguishing unit 600.

The side plate 610 is coupled to the grid 620. Specifically, insertion protrusions provided at opposite sides of the grid 620, i.e., the right end and the left end in the illustrated embodiment, are inserted into and coupled to some of the through holes of the side plate 610.

The side plate 610 is coupled to the grid cover 630. Specifically, the grid cover 630 is coupled to the upper side of the side plate 610. The above coupling may be achieved by a fitting coupling between the side plate 610 and the grid cover 630 or by a separate fastening member.

The side plate 610 is coupled to the magnet unit 500. Specifically, the magnet unit 500 is coupled to the lower side of the side plate 610, that is, to one side opposite to the grid cover 630. The above coupling may be achieved by a separate fastening member.

The side plate 610 is coupled to the arc runner 650. Specifically, the arc runner 650 is coupled to the rear side of the side plate 610, that is, to one side opposite to the fixed contact 311. The above coupling may be achieved by a separate fastening member.

The grid 620 guides an arc generated when the fixed contact 311 and the movable contact 321 are spaced apart to the arc extinguishing unit 600.

The grid 620 may be formed of a material having magnetism. This is to apply an attractive force to the arc, which is a flow of electrons.

A plurality of grids 620 may be provided. The plurality of grids 620 may be spaced apart from each other and stacked. In the illustrated embodiment, nine grids 620 are provided and stacked in the front-rear direction.

The number of grids 620 may be changed. Specifically, the number of grids 620 may be changed according to the size and performance of the arc extinguishing unit 600, or the rated capacity of the air circuit breaker 10 in which the arc extinguishing unit 600 is provided, or the like.

An introduced arc may be subdivided and flowed through a space formed by the plurality of grids 620 being spaced apart from each other. Accordingly, the pressure of the arc may be increased, and the moving speed and the extinguishing speed of the arc may be increased.

The arc runner 650 is positioned adjacent to the grid 620 furthest from the fixed contact 311 among the plurality of grids 620, i.e., the grid 620 on the rear side in the illustrated embodiment.

An end of the grid 620 in the width direction, i.e., left-right direction in the illustrated embodiment, may be formed to protrude toward the fixed contact 311, that is, toward the lower side. That is, the grid 620 is formed in a peak shape with left and right ends pointing downward.

Accordingly, the generated arc may effectively proceed toward the end of the grid 620 in the left-right direction, and may easily flow to the arc extinguishing unit 600.

The magnet unit 500 is located on the outer side of the left-right end of the grid 620, i.e., on the lower side in the illustrated embodiment.

The grid 620 is coupled to the side plate 610. Specifically, a plurality of coupling protrusions are formed at the edges of the grid 620 in the width direction, i.e., the left-right direction in the illustrated embodiment, in the extension direction, i.e., the up and down direction in the illustrated embodiment. The coupling protrusions of the grid 620 are inserted into and coupled to the through holes formed in the side plate 610.

The outermost grid 625 is a grid disposed closest to the fixed contact 311 among the plurality of grids 620.

The outermost grid 625 may further include a coupling leg 628 protruding downward from a lower end of the center of the grid 620, and a grid leg 626 formed to be spaced apart from opposite sides of the coupling leg 628 and protruding downward.

Figure 6:
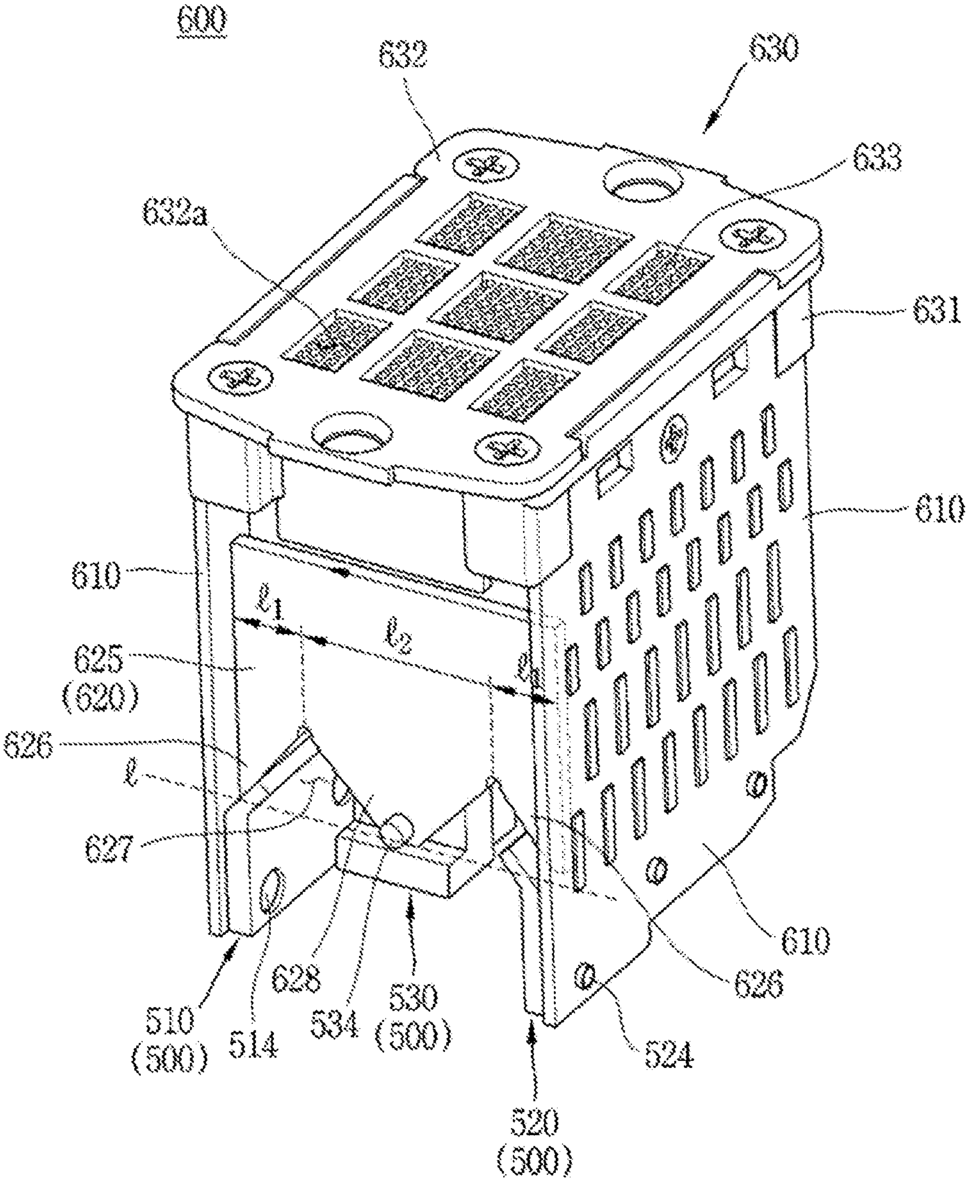
FIG. 6 is a perspective view illustrating an exemplary embodiment of an arc extinguishing unit provided in the air circuit breaker of FIG. 1.

For example, as shown in FIG. 6, the coupling leg 628 protrudes from the center of the grid 620 to the bottom. In this case, the length of the coupling leg 628 protruding may be similar to the length of the grid leg 626 protruding downward from both ends of the grid 620. Accordingly, the ends of the coupling leg 628 and the grid leg 626 may be disposed on a line (l) similar to each other. In addition, the width l2 of the coupling leg 628 may be about twice the width l1 of each grid leg 626. A coupling groove **628*a* for coupling with a third magnet unit 530 may be formed at a lower portion of the coupling leg 628**.

A concave groove 627 may be formed between the grid leg 626 and the coupling leg 628. Inclined portions of the first magnet unit 510 and the second magnet unit 520 may be disposed along the concave groove 627.

As such, in the arc extinguishing unit 600 according to an embodiment of the present disclosure, the length at which the coupling leg 628 protrudes to the bottom is similar to the length at which the grid leg 626 protrudes to the bottom, and the width of the coupling leg 628 is twice the width of one grid leg 626, so that the outermost grid 625 may be symmetric about the vertical axis of the central portion of the grid 620.

The outermost grid 625 and the magnet unit 500 are formed symmetrically about the vertical axis of the central portion of the grid 620, and thus there is an effect that the arc is stably guided to the grid 620 regardless of the location where the arc is generated.

In addition, the outermost grid 625 includes a coupling leg 628 protruding from the center of the outermost grid 625 to the bottom, and thus the generated arc may be applied to the coupling leg 628 through the third magnet unit 530.

One side of the grid 620 facing the grid cover 630, i.e., the upper end in the illustrated embodiment, may be positioned adjacent to the grid cover 630. The arc flowing along the grid 620 may pass through the grid cover 630 and be discharged to the outside.

The grid cover 630 forms the upper side of the arc extinguishing unit 600. The grid cover 630 is configured to cover the upper end of the grid 620. The arc passing through the space formed by the plurality of grids 620 spaced apart from each other may be discharged to the outside of the air circuit breaker 10 through the grid cover 630.

The grid cover 630 is coupled to the side plate 610. A protrusion inserted into the through hole of the side plate 610 may be formed at an edge of the grid cover 630 in the width direction, i.e., the left-right direction in the illustrated embodiment. In addition, the grid cover 630 and the side plate 610 may be coupled by a separate fastening member.

The grid cover 630 is formed to extend in one direction, i.e., in the front-rear direction in the illustrated embodiment. It will be understood that the above direction is the same as the direction in which the plurality of grids 620 are stacked.

The length of the grid cover 630 in the other direction, i.e., the width direction in the illustrated embodiment, may be determined according to the length of the plurality of grids 620 in the width direction.

In the illustrated embodiment, the grid cover 630 includes a cover body 631, an upper frame 632, a mesh part 633, and a circuit breaking plate (not shown).

The cover body 631 forms the outer shape of the grid cover 630. The cover body 631 is coupled to the side plate 610. In addition, the upper frame 632 is coupled to the cover body 631.

A predetermined space is formed inside the cover body 631. The space may be covered by the upper frame 632. The mesh part 633 and the circuit breaking plate are accommodated in the space. Accordingly, the space may be referred to as an "accommodation space".

The accommodation space communicates with a space formed by spacing the grids 620 apart. As a result, the accommodation space communicates with the inner space of the cover unit 100. Accordingly, the generated arc can flow into the accommodation space of the cover body 631 by passing through the space formed by the separation of the grids 620.

An upper end of the grid 620 may be in contact with one side of the cover body 631 facing the grid 620, i.e., the lower side in the illustrated embodiment. In an embodiment, the cover body 631 may support the upper end of the grid 620.

The cover body 631 may be formed of an insulating material. This is to prevent distortion of the magnetic field for forming an arc-guided path A.P.

The cover body 631 may be formed of a heat-resistant material. This is to prevent damage or shape deformation by the generated arc.

In the illustrated embodiment, the length of the cover body 631 in the front-rear direction is longer than the length in the left-right direction. The shape of the cover body 631 may be changed according to the shape of the side plate 610 and the shape and number of the grids 620.

The upper frame 632 is coupled to one side of the cover body 631 opposite to the grid 620, i.e., the upper side in the illustrated embodiment.

The upper frame 632 is coupled to the upper side of the cover body 631. The upper frame 632 is configured to cover the accommodation space formed in the cover body 631, the mesh part 633 accommodated in the accommodation space, and the circuit breaking plate.

In the illustrated embodiment, the length of the upper frame 632 in the front-rear direction is longer than the length in the left-right direction. The upper frame 632 may be provided in an arbitrary shape capable of stably being coupled to the upper side of the cover body 631 and covering the accommodation space and components accommodated in the accommodation space.

A plurality of through holes are formed in the upper frame 632. Through the through hole, an arc passing between the grids 620 and extinguished may be discharged. In the illustrated embodiment, three through-holes are provided in three rows in the front-rear direction, three in the left-right direction, and a total of nine through holes are formed. The number of through holes may be changed.

The through holes are located to be spaced apart from each other. A kind of rib is formed between the through holes. The rib may press the mesh part 633 accommodated in the space of the cover body 631, and the circuit breaking plate from the upper side.

Accordingly, even though an arc is generated, the mesh part 633 and the circuit breaking plate do not arbitrarily move away from the accommodation space of the cover body 631.

The upper frame 632 may be fixedly coupled to an upper side of the cover body 631. In the illustrated embodiment, the upper frame 632 is fixedly coupled to the upper side of the cover body 631 by a fastening member.

The mesh part 633 and the circuit breaking plate are positioned in the accommodation space of the cover body 631 between the upper frame 632 and the cover body 631, that is, in the lower side of the upper frame 632.

In other words, the mesh part 633 and the circuit breaking plate are stacked from an upper side to a lower side in the accommodation space of the cover body 631.

The mesh part 633 passes through a space formed between the grids 620 and serves to filter out impurities remaining in the extinguished arc. The extinguished arc may pass through the mesh part 633 and be discharged to the outside after remaining impurities are removed.

That is, the mesh part 633 functions as a kind of filter.

The mesh part 633 includes a plurality of through holes. It is preferable that the size, that is, the diameter of the through hole is smaller than the diameter of the impurity particles remaining in the arc. In addition, it is preferable that the diameter of the through hole is sufficiently large so that the gas included in the arc can pass through.

A plurality of mesh parts 633 may be provided. The plurality of mesh parts 633 may be stacked in the up and down direction. Accordingly, impurities remaining in the arc passing through the mesh part 633 can be effectively removed.

The mesh part 633 is accommodated in the accommodation space formed inside the cover body 631. The shape of the mesh part 633 may be determined according to the shape of the accommodation space.

The mesh part 633 is located below the upper frame 632. The plurality of through holes formed in the mesh part 633 communicate with the plurality of through holes formed in the upper frame 632. Accordingly, the arc passing through the mesh part 633 may pass through the upper frame 632 and be discharged to the outside.

The plurality of through holes formed in the mesh part 633 communicate with a space in which the grids 620 are spaced apart. As a result, the plurality of through holes formed in the mesh part 633 communicate with the inner space of the cover unit 100.

The circuit breaking plate is positioned below the mesh part 633.

The circuit breaking plate provides a passage for the arc passing through the space formed between the grids 620 to flow toward the mesh part 633.

The circuit breaking plate is accommodated in the accommodation space of the cover body 631. The circuit breaking plate is located at the lowermost side of the accommodation space of the cover body 631.

In the illustrated embodiment, the circuit breaking plate is formed to have a rectangular cross-section in which the length in the front-rear direction is longer than the length in the left-right direction. The shape of the circuit breaking plate may be changed according to the shape of the cross-section of the accommodation space of the cover body 631.

The grid 620 is positioned below the circuit breaking plate. In an embodiment, the upper end of the grid 620, i.e. one end of the grid 620 facing the circuit breaking plate, may be in contact with the circuit breaking plate.

The circuit breaking plate includes a through hole (not shown).

The through hole is a passage through which an arc passing through a space formed by spacing the plurality of grids 620 from each other flows into the accommodation space of the cover body 631. The through hole is formed through in a direction perpendicular to the circuit breaking plate, i.e., in the up and down direction in the illustrated embodiment.

A plurality of through holes may be formed. The plurality of through holes may be disposed to be spaced apart from each other.

The arc runner 650 is located on one side of the side plate 610 facing the fixed contact 311 and the movable contact 321. In the illustrated embodiment, the arc runner 650 is located on the lower side of the side plate 610.

The arc runner 650 is located on the other side of the side plate 610 opposite to the fixed contact 311. Specifically, the arc runner 650 is located on the rear side in the lower side of the side plate 610 so as to be opposite to the fixed contact 311 located on the front side of the side plate 610.

The arc runner 650 is coupled to the side plate 610. The coupling may be formed by inserting a protrusion formed at an end of the arc runner 650 in the left-right direction into a through hole formed in the side plate 610.

The arc runner 650 may be formed of a conductive material. This is to guide the arc effectively by applying an attractive force to the flowing arc. In an embodiment, the arc runner 650 may be formed of copper, iron, or an alloy including the same.

The arc runner 650 extends toward the grid 620 by a predetermined length. In an embodiment, the arc runner 650 may be disposed to cover the grid 620 located farthest from the fixed contact 311, i.e., the grid 620 located at the rearmost side in the illustrated embodiment, from the rear side.

Accordingly, since the arc does not extend beyond the grid 620 located at the rearmost side, damage to the cover unit 100 can be prevented. Also, the generated arc can be effectively guided toward the grid 620.

3. Description of the Magnet Unit 500

Figure 7:
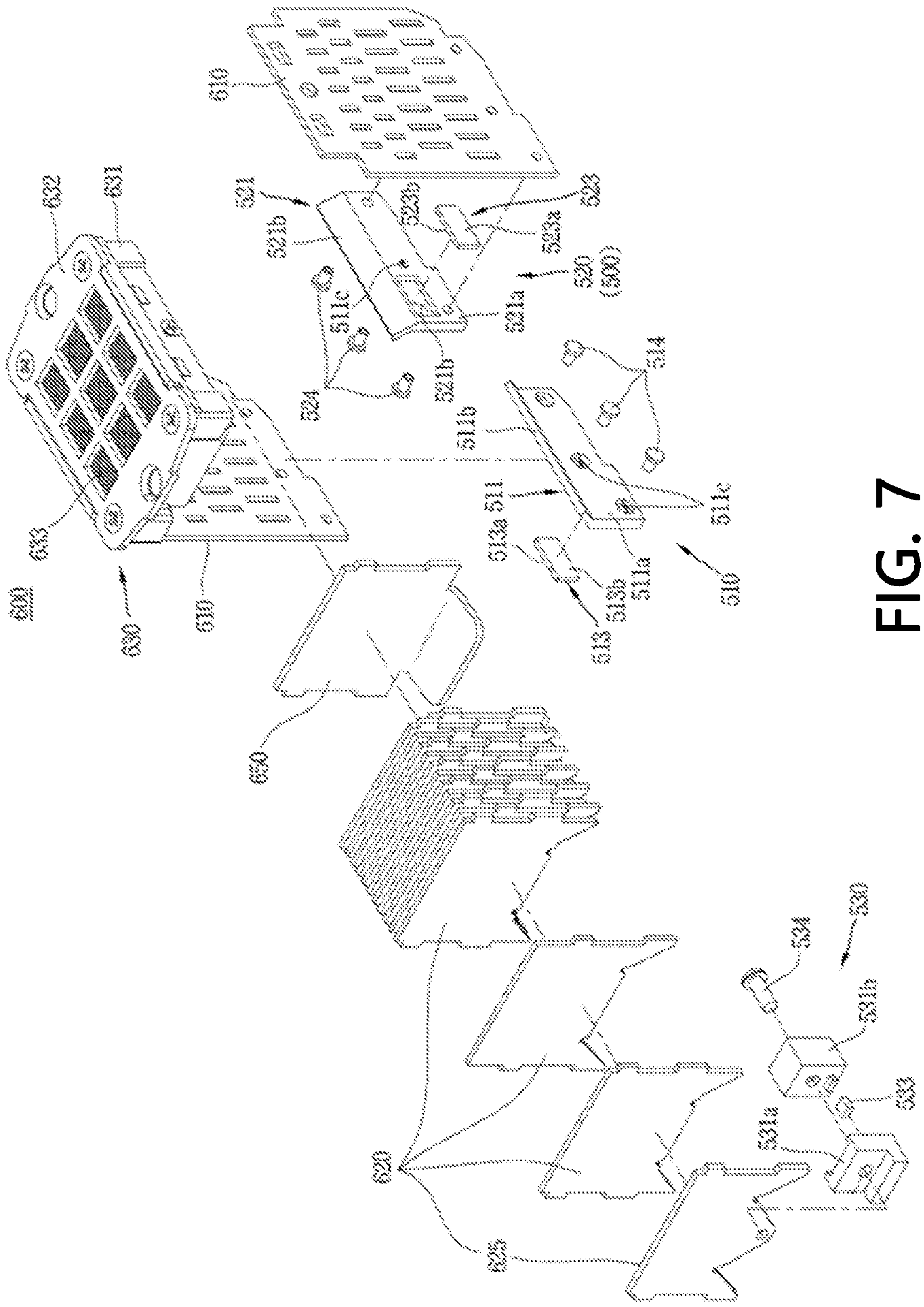
FIG. 7 is an exploded perspective view illustrating an exemplary embodiment of the arc extinguishing unit shown in FIG. 6.

Referring to the drawings, the magnet unit 500 forms a magnetic field for changing the path of an arc formed between the fixed contact 311 and the movable contact 321 disposed to be spaced apart from the fixed contact 311. Referring to FIGS. 6 and 7, the magnet unit 500 may be disposed adjacent to the outermost grid 625 adjacent to the fixed contact 311 among the plurality of grids 620.

The magnet unit 500 may include a first magnet unit 510, a second magnet unit 520 and a third magnet unit 530.

(1) Description of the First Magnet Unit 510 and the Second Magnet Unit 520

The first magnet unit 510 is coupled to the side plate 610 and extends in a direction in which the plurality of grids 620 coupled to the side plate 610 are aligned. Specifically, referring to FIG. 7, the first magnet unit 510 may extend long in the longitudinal direction of the side plate 610, that is, in a direction in which the plurality of grids 620 are disposed spaced apart from each other, and be coupled to the side plate 610.

According to the present disclosure, since the first magnet unit 510 extends in the longitudinal direction of the side plate 610, it is easy to apply the generated arc to the grid 620 through the first magnet unit 510 regardless of the position at which the arc in the arc extinguishing unit 600 is generated close to or away from the fixed contact 311.

The first magnet unit 510 includes a case 511 formed to define a storage part therein and coupled to the grid 620 or the side plate 610, and a first magnetic body 513 accommodated in the storage part and configured to form a magnetic field.

The case 511 extends in the longitudinal direction of the side plate 610 as described above. The case 511 includes a vertical portion 511*a* formed in a direction parallel to the side plate 610 and contacting the side plate 610, and an inclined portion 511*b* formed at a predetermined angle with the vertical portion 511*a* and bent toward a central portion of the grid 620 and extending therefrom.

The vertical portion 511*a* is a portion where the first magnet unit 510 is coupled to the side plate 610. The vertical portion 511*a* is located on one side of the side plate 610 facing the fixed contact terminal 310, i.e., on the lower side in the illustrated embodiment. The vertical portion 511*a* may be coupled to the side plate 610 by a coupling member 514.

The vertical portion 511*a* extends in a direction toward the grid 620, i.e., upward in the illustrated embodiment. In an embodiment, the vertical portion 511*a* may be in contact with the side plate 610 and may extend. In another embodiment, the vertical portion 511*a* may extend parallel to the side plate 610.

The inclined portion 511*b* extends from the end of the vertical portion 511*a*.

The inclined portion 511*b* may be formed to partially encase a peak portion formed at an end portion of the grid 620 in the left-right direction. The inclined portion 511*b* extends at a predetermined angle with the vertical portion 511*a*. In an embodiment, the inclined portion 511*b* may extend to form an obtuse angle with the vertical portion 511*a*.

A coupling member groove 511*d* may be formed in the case 511 so that the case 511 and the side plate 610 may be coupled to each other by the coupling member 514.

The second magnet unit 520 is coupled to the side plate 610 facing the side plate 610 to which the first magnet unit 510 is coupled, and is disposed at a position corresponding to the first magnet unit 510.

The second magnet unit 520 includes a case 521 formed to define a storage part 521*c* therein and coupled to the grid 620 or the side plate 610, and a second magnetic body 523 accommodated in the storage part 521*c* and configured to form a magnetic field.

The case 521 extends in the longitudinal direction of the side plate 610 as described above. The case 521 includes a vertical portion 521*a* formed in a direction parallel to the side plate 610 and contacting the side plate 610, and an inclined portion 521*b* formed at a predetermined angle with the vertical portion 521*a* and bent toward a central portion of the grid 620 and extending therefrom.

The vertical portion 521*a* is a portion where the second magnet unit 520 is coupled to the side plate 610. The vertical portion 521*a* is located on one side of the side plate 610 facing the fixed contact terminal 310, i.e., on the lower side in the illustrated embodiment. The vertical portion 521*a* may be coupled to the side plate 610 by a coupling member 524.

The vertical portion 521*a* extends in a direction toward the grid 620, i.e., upward in the illustrated embodiment. In an embodiment, the vertical portion 521*a* may be in contact with the side plate 610 and may extend. In another embodiment, the vertical portion 521*a* may extend parallel to the side plate 610.

The inclined portion 521*b* extends from the end of the vertical portion 521*a*.

The inclined portion 521*b* may be formed to partially encase a peak portion formed at an end portion of the grid 620 in the left-right direction. The inclined portion 521*b* extends at a predetermined angle with the vertical portion 521*a*. In an embodiment, the inclined portion 521*b* may extend to form an obtuse angle with the vertical portion 521*a*.

A coupling member groove 521*d* may be formed in the case 521 so that the case 521 and the side plate 610 may be coupled to each other by the coupling member 524.

The cases 511 and 521 of the first magnet unit 510 and the second magnet unit 520 may guide an arc such that an arc generated inside the arc extinguishing unit 600 flows toward the grid 620.

Specifically, the cases 511 and 521 may be formed of a material with which an arc generated inside the arc extinguishing unit 600 may flow toward the grid 620 by applying the arc. That is, the cases 511 and 521 may be formed of a magnetic material having magnetic properties. This is to make the arc, which is the flow of electrons, flow and transfer it toward the grid 620.

The cases 511 and 521 may be formed of a heat-resistant material. This is to prevent damage and shape deformation due to the generated arc. In an embodiment, the cases 511 and 521 may be formed of a ceramic material.

The cases 511 and 521 are disposed to partially encase a peak portion formed on opposite sides of the grid 620, i.e., on the end in the left-right direction in the illustrated embodiment. Accordingly, arcs guided by the cases 511 and 521 may not be concentrated on any one part of the grid 620.

The cases 511 and 521 may extend in the extension direction of the side plate 610, i.e., in the front-rear direction in the illustrated embodiment. That is, the cases 511 and 521 may extend between the grid 620 located at the frontmost side and the grid 620 located at the rearmost side.

The arc runner 650 guides a generated arc so that the arc flows toward the grid 620. Arcs generated by the cases 511 and 521 may be prevented from progressing beyond the grid 620 to one side wall of the cover unit 100. Accordingly, it is possible to prevent the cover unit 100 from being damaged by the generated arc.

(2) Arrangement of the First Magnetic Body and the Second Magnetic Body

The magnetic bodies of the first magnet unit 510 and the second magnet unit 520 includes first surfaces 513*a* and 523*a* magnetized to the N pole and second surfaces 513*b* and 523*b* magnetized to the S pole. In this case, the first surfaces 513*a* and 523*a* of the first magnet unit 510 and the second magnet unit 520 are disposed along a direction in which the first magnet unit 510 and the second magnet unit 520 are away from each other.

Figure 18:
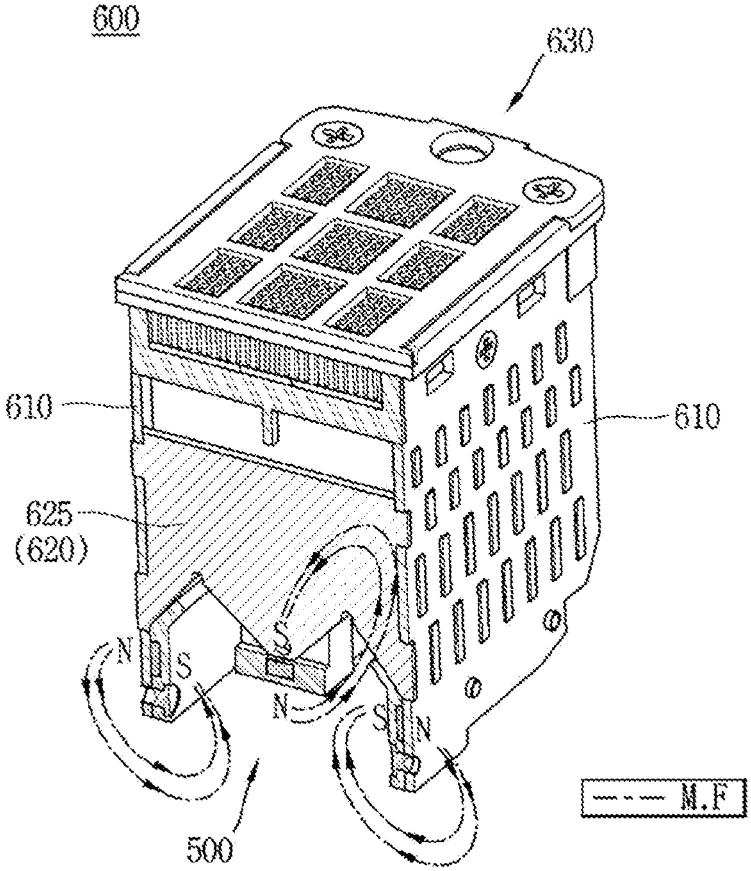
FIG. 18 is a perspective view illustrating magnetic fields formed by a first magnet unit to a third magnet unit of the arc extinguishing unit shown in FIG. 17.

Specifically, referring to FIGS. 7 and 18, the first surface 513*a* of the first magnet unit 510 is disposed in a direction opposite to the direction toward the second magnet unit 520. The second surface 513*b* of the first magnet unit 510 is disposed in a direction toward the second magnet unit 520. The first surface 523*a* of the second magnet unit 520 is disposed in a direction opposite to the direction toward the first magnet unit 510. The second surface 523*b* of the second magnet unit 520 is disposed in a direction toward the first magnet unit 510.

Figure 19:
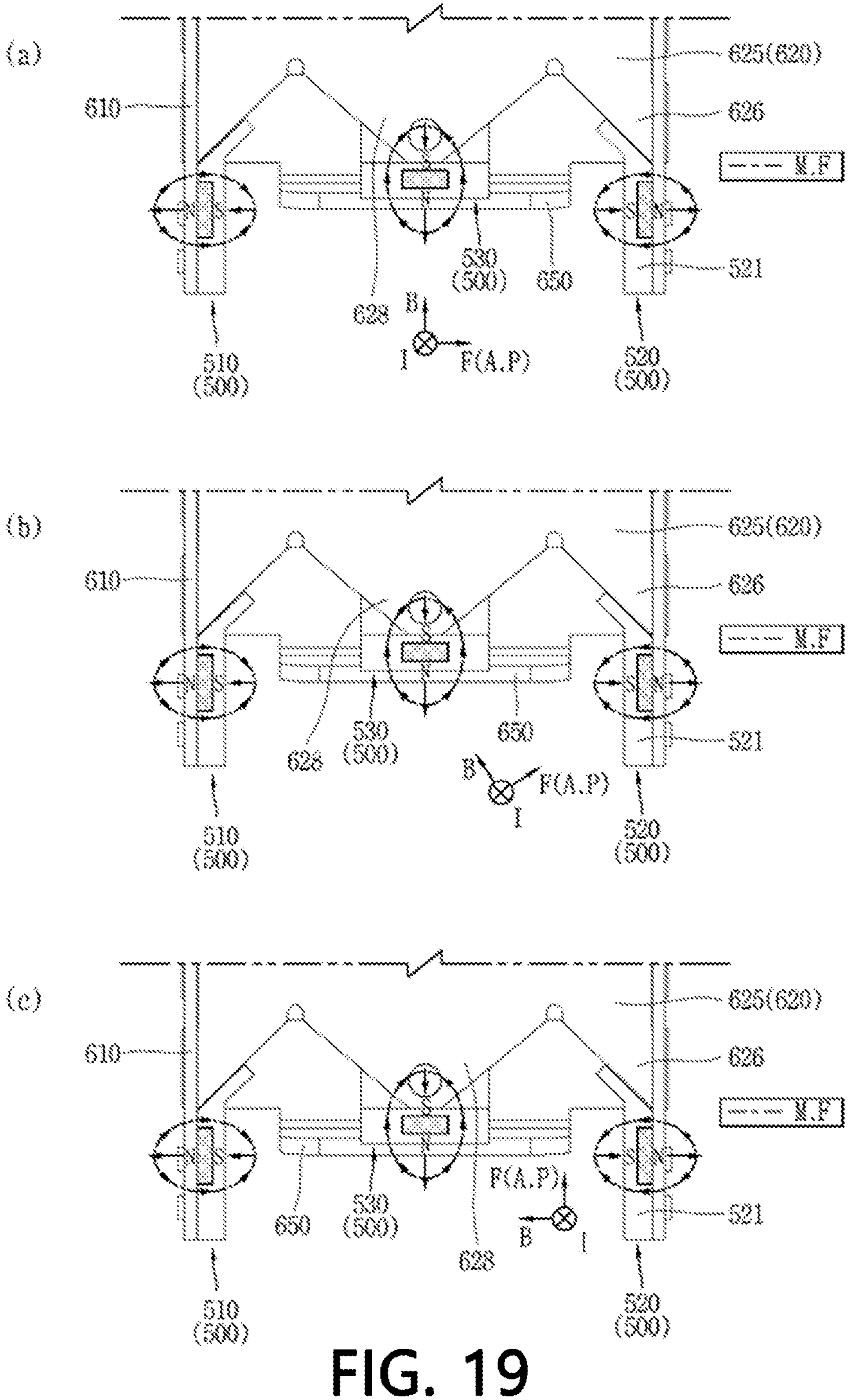
FIGS. 19 and 20 are conceptual diagrams illustrating electromagnetic force received by an arc by an arc extinguishing unit according to an exemplary embodiment of the present disclosure.
Figure 20:
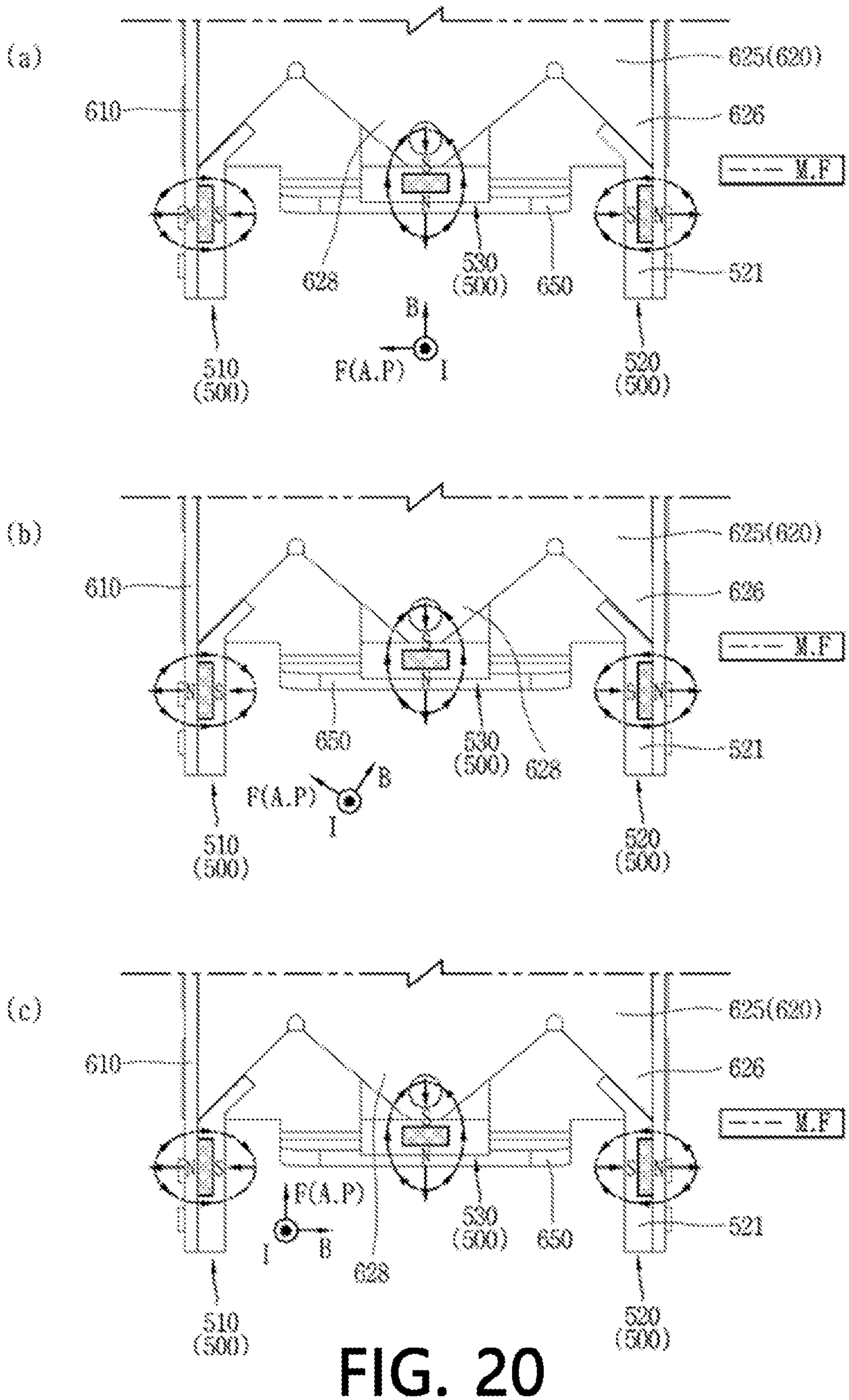

Through this, the first magnet unit 510 and the second magnet unit 520 may form magnetic fields formed in opposite directions. Specifically, as shown in FIGS. 18 to 20, the first magnet unit 510 and the second magnet unit 520 may form a magnetic field in which magnetic flux is formed in opposite directions to each other.

(3) Description of the Third Magnet Unit 530

The third magnet unit 530 is coupled to any one grid 620 among the plurality of grids 620. For example, as shown in the drawings, the third magnet unit 530 may be coupled to the outermost grid 625 adjacent to the fixed contact 311 among the plurality of grids 620 of the arc extinguishing unit 600.

The third magnet unit 530 includes cases 531*a* and 531*b* formed to define a storage part 531*a*4 therein and coupled to the grid 620 or the side plate 610, and a magnetic body accommodated in the storage part 531*a*4 and configured to form a magnetic field.

Figure 8:
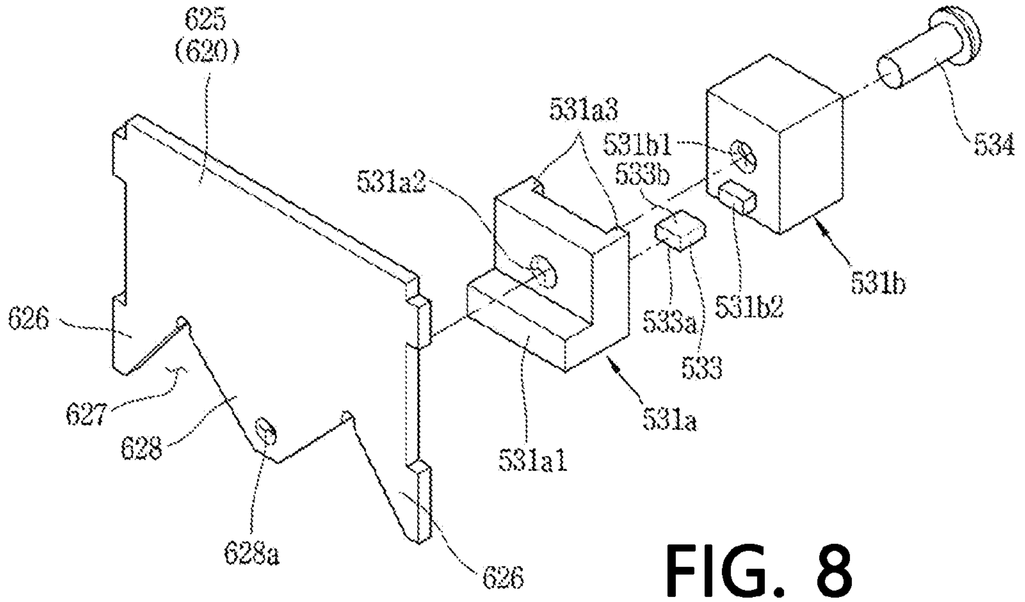
FIGS. 8 and 9 are exploded perspective views for explaining a third magnet unit shown in FIG. 6.
Figure 9:
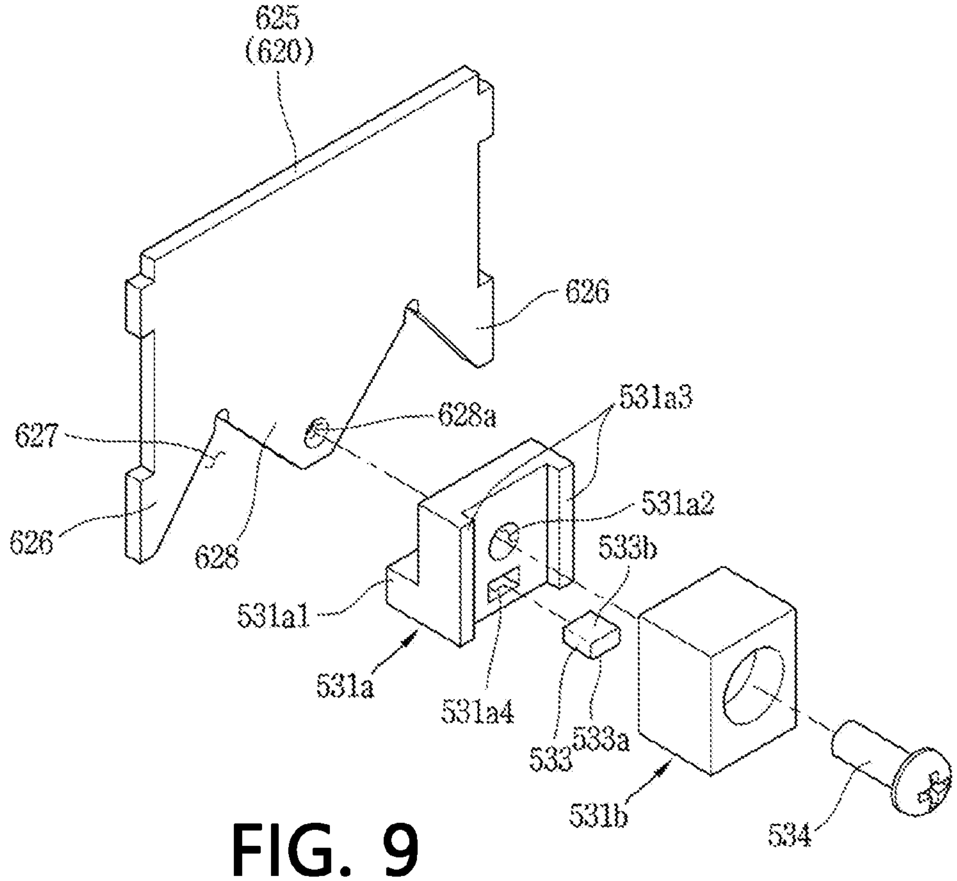
Figure 10:
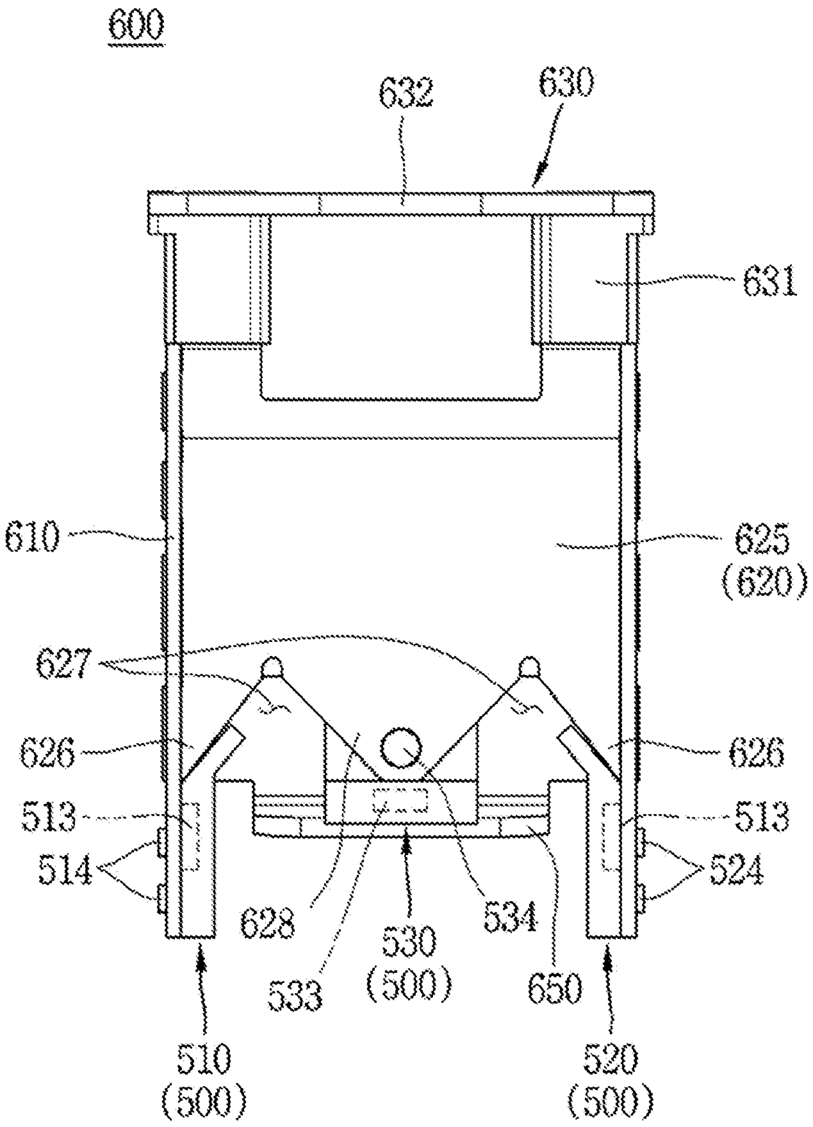
FIG. 10 is a front view illustrating an exemplary embodiment of the arc extinguishing unit shown in FIG. 6.
Figure 11:
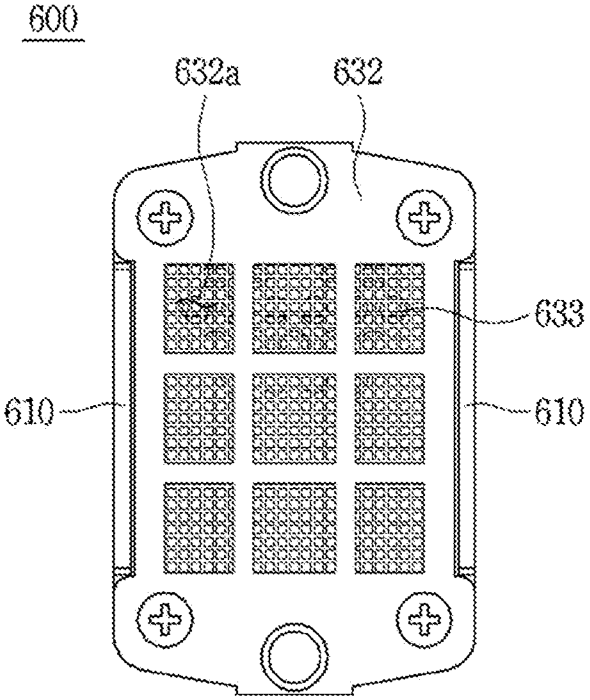
FIG. 11 is a plan view illustrating an exemplary embodiment of the arc extinguishing unit shown in FIG. 6.

Referring to FIGS. 8 and 9, the cases 531*a* and 531*b* may include a first case 531*a* coupled to the outermost grid 625 and having a storage part 531*a*4 configured to accommodate a magnetic body therein and a second case 531*b* supporting the magnetic body at a rear end of the first case 531*a* and coupled to the first case 531*a* through a coupling member 534.

A coupling hole 531*a*2 penetrating in the front-rear direction at the central portion of the first case 531*a* may be formed in the first case 531*a*. The coupling member 534 may be inserted through the coupling hole 531*a*2 so that the outermost grid 625 and the third magnet unit 530 are coupled to each other.

The first case 531*a* may include a protruding portion 531*a*1 at a lower end of the front surface. The protruding portion 531*a*1 may firmly couple with the outermost grid 625, and may serve as a peak for easily transferring an arc generated in the arc extinguishing unit 600 to the grid 620 through the first case 531*a*.

The rear surface of the first case 531*a* may be provided with wing portions 531*a*3 protruding in opposite sides in the up and down direction. The wing portion 531*a*3 may reduce left and right movement of the second case 531*b* when the second case 531*b* is inserted.

The cases 531*a* and 531*b* of the third magnet unit 530 may be formed of a magnetic material with which an arc generated inside the arc extinguishing unit 600 may flow toward the grid 620 by applying the arc. In this case, the bonding force between the third magnet unit 530 and the outermost grid 625 may be weakened due to an impact when an arc is applied to the cases 531*a* and 531*b* of the third magnet unit 530. To compensate for this, the first case 531*a* may include the protruding portion 531*a*1 and the wing portion 531*a*3.

The second case 531*b* may be coupled to the first case 531*a* on the rear surface of the first case 531*a*.

A coupling hole 531*b*1 may be formed in the second case 531*b*. The coupling member 534 is inserted through the coupling hole 531*b*1 so that the second case 531*b* may be coupled to the first case 531*a*. Furthermore, the first case 531*a* and the second case 531*b* may be coupled to coupling groove 628*a* formed in the coupling leg 628 of the outermost grid 625.

In addition, on the lower portion of the front surface of the second case 531*b*, a protrusion 531*b*2 may be formed to press the third magnetic body 533 to prevent the third magnetic body 533 accommodated in the first case 531*a* from being separated from the first case 531*a*.

The magnet unit 500 may be disposed symmetrically about the central portion of the grid 620 disposed between the side plates 610 of the arc extinguishing unit 600. In addition, the magnet unit 500 may be disposed on at least one of the grid 620 and the side plate 610.

Specifically, referring to FIGS. 6 and 7, the first magnet unit 510 and the second magnet unit 520 are disposed symmetrically around the central portion of the grid 620. In addition, the third magnet unit 530 is also disposed symmetrically around the central portion of the grid 620.

In another embodiment, only the first magnet unit 510 and the second magnet unit 520 may be disposed in the arc extinguishing unit 600. In yet another embodiment, only the third magnet unit 530 may be disposed in the arc extinguishing unit 600. Even in this case, they may be disposed symmetrically around the central portion of the grid 620.

The third magnetic body 533 of the third magnet unit 530 includes a first surface 533*a* magnetized to the N pole and a second surface 533*b* magnetized to the S pole. In this case, when the fixed contact 311 and the movable contact 321 are spaced apart from each other, the first surface 533*a* of the third magnet unit 530 may be disposed toward a space through which the movable contact 321 passes.

Figure 12:
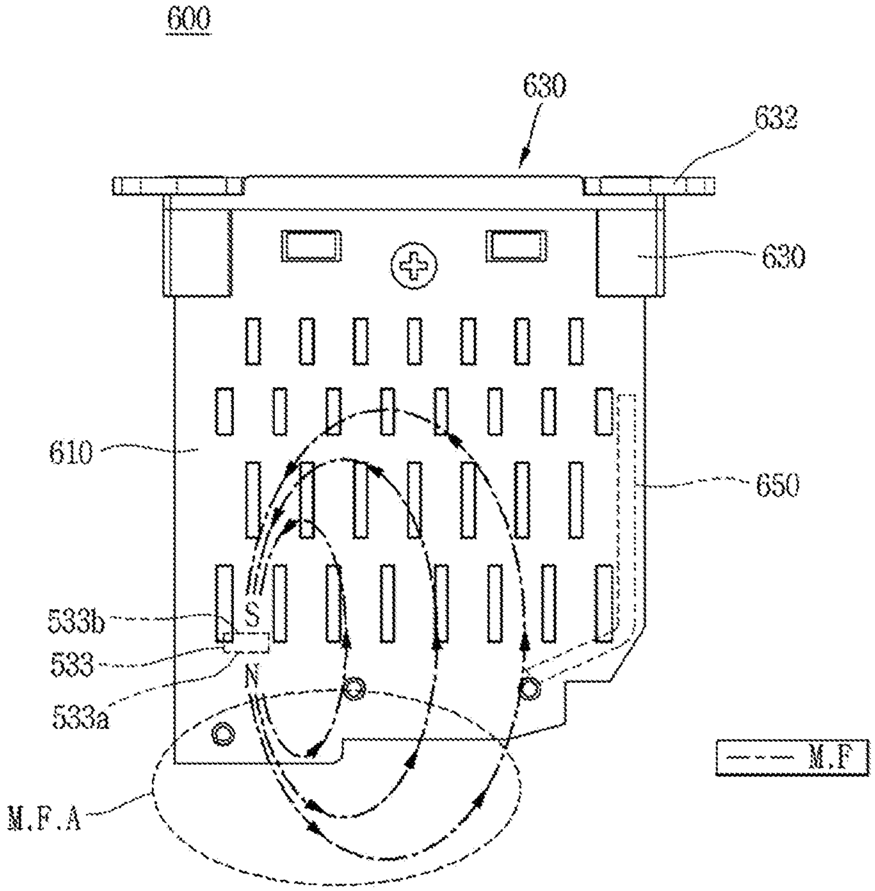
FIG. 12 is a side view illustrating an exemplary embodiment of the arc extinguishing unit shown in FIG. 6.
Figure 13:
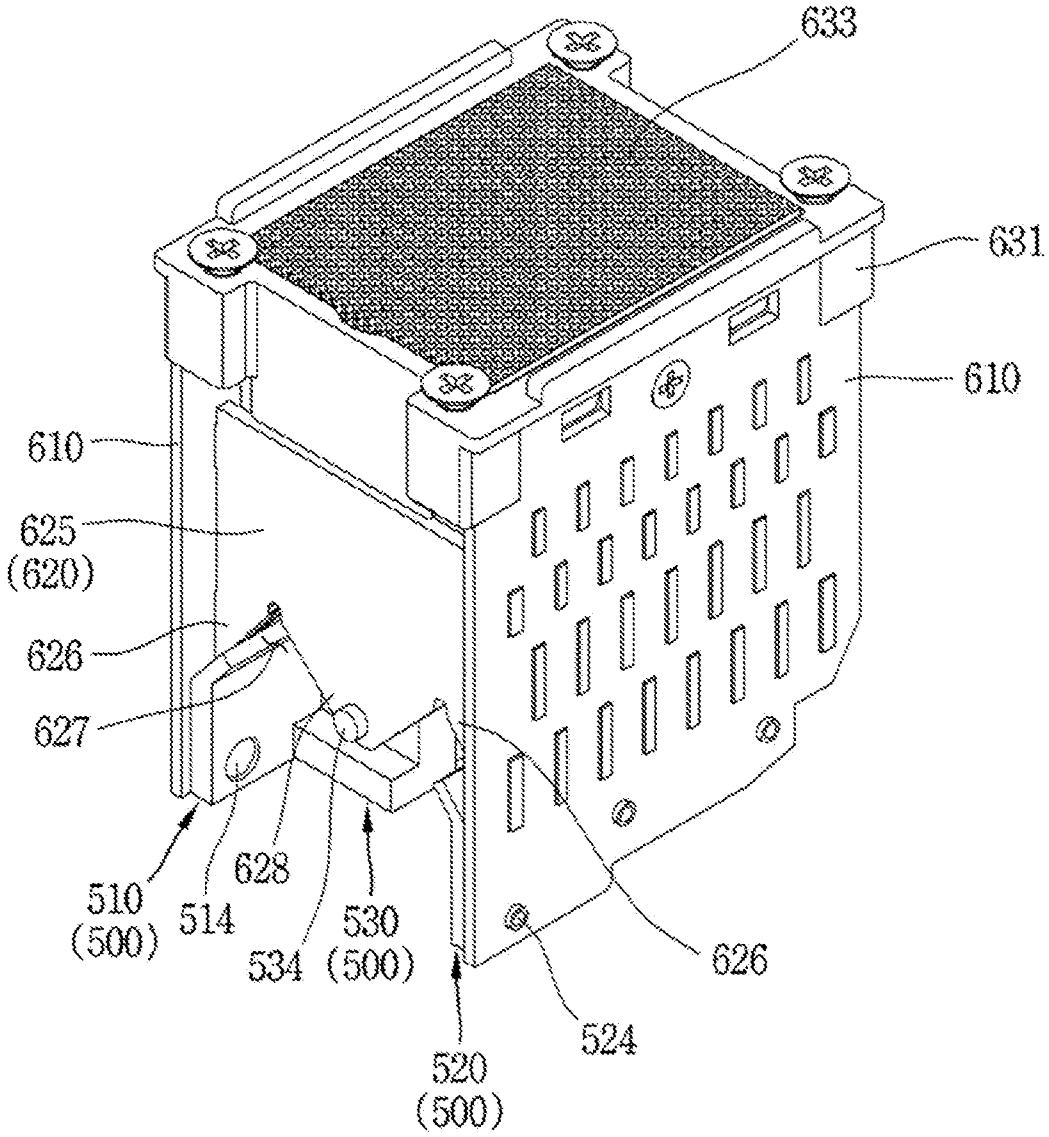
FIG. 13 is a perspective view illustrating a state in which an arc cover unit is removed from the arc extinguishing unit of FIG. 6.
Figure 14:
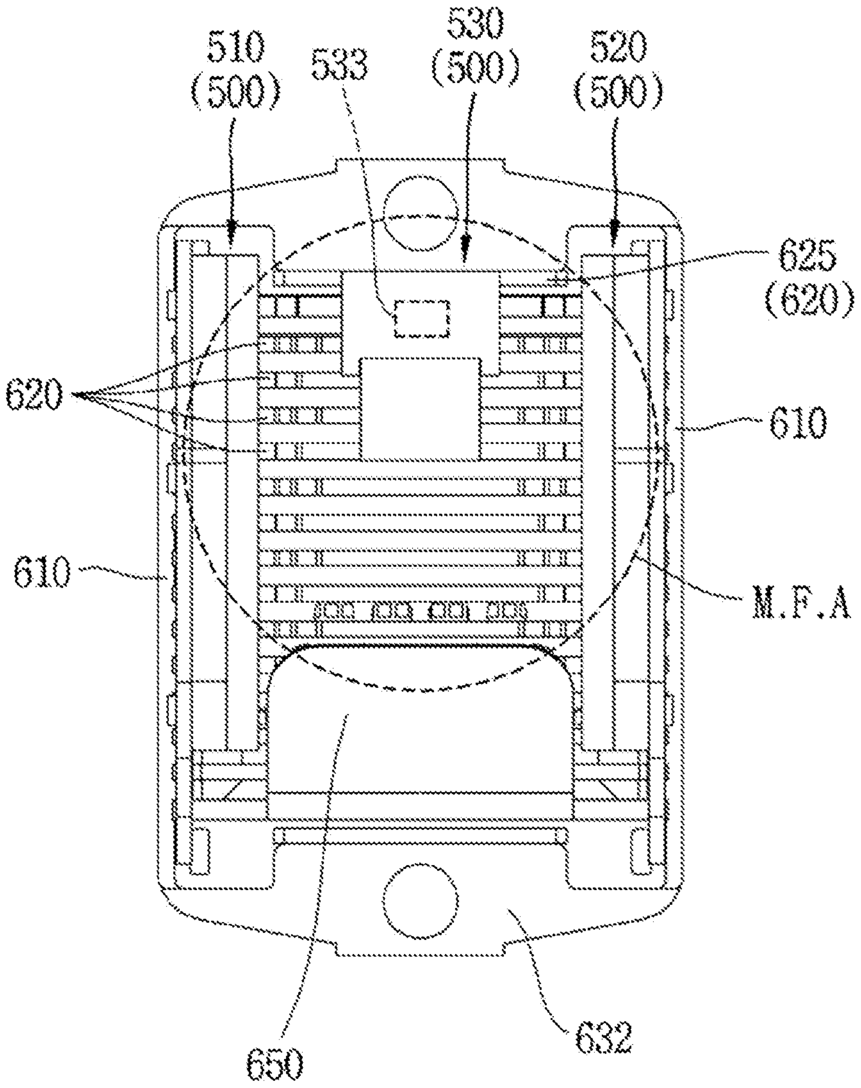
FIG. 14 is a bottom view illustrating an exemplary embodiment of the arc extinguishing unit shown in FIG. 6.
Figure 15:
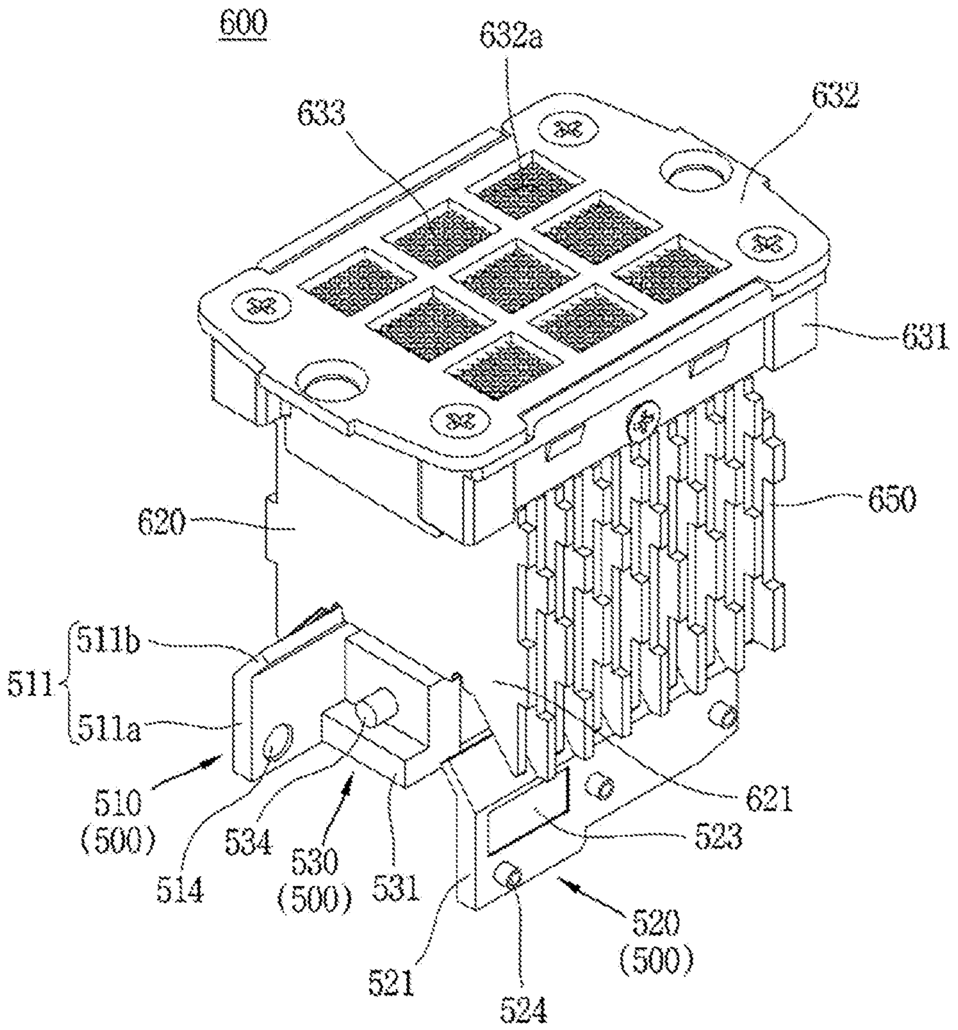
FIG. 15 is a perspective view illustrating a state in which parts of the side plate and grid of the arc extinguishing unit shown in FIG. 6 are removed.
Figure 16:
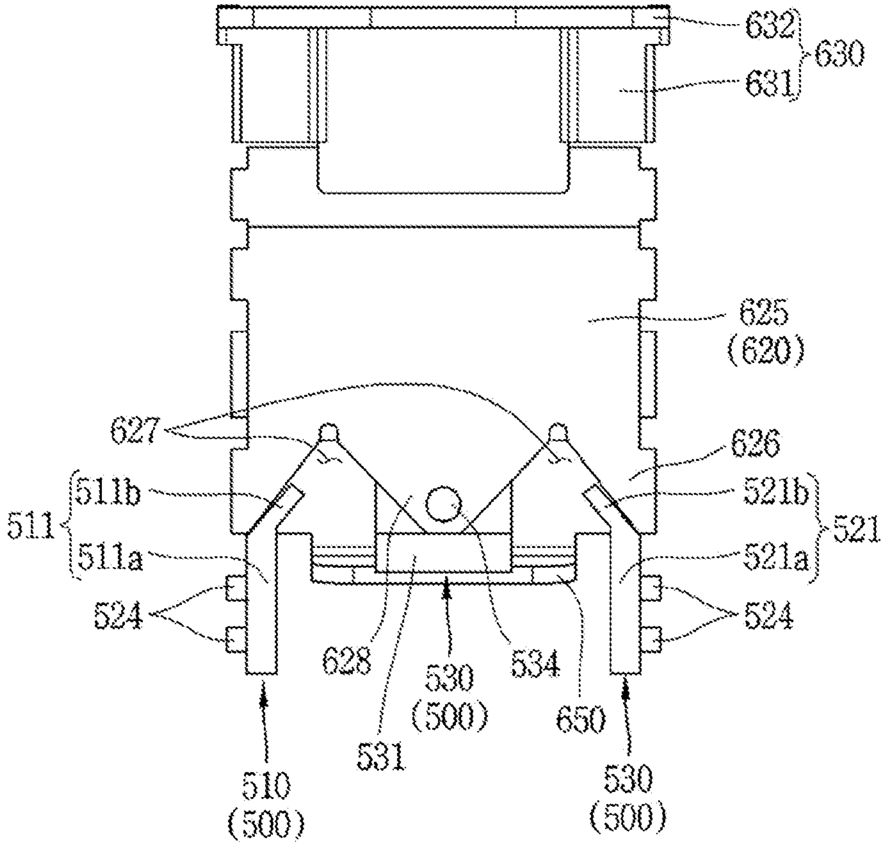
FIG. 16 is a front view illustrating an exemplary embodiment of the arc extinguishing unit shown in FIG. 6.
Figure 17:
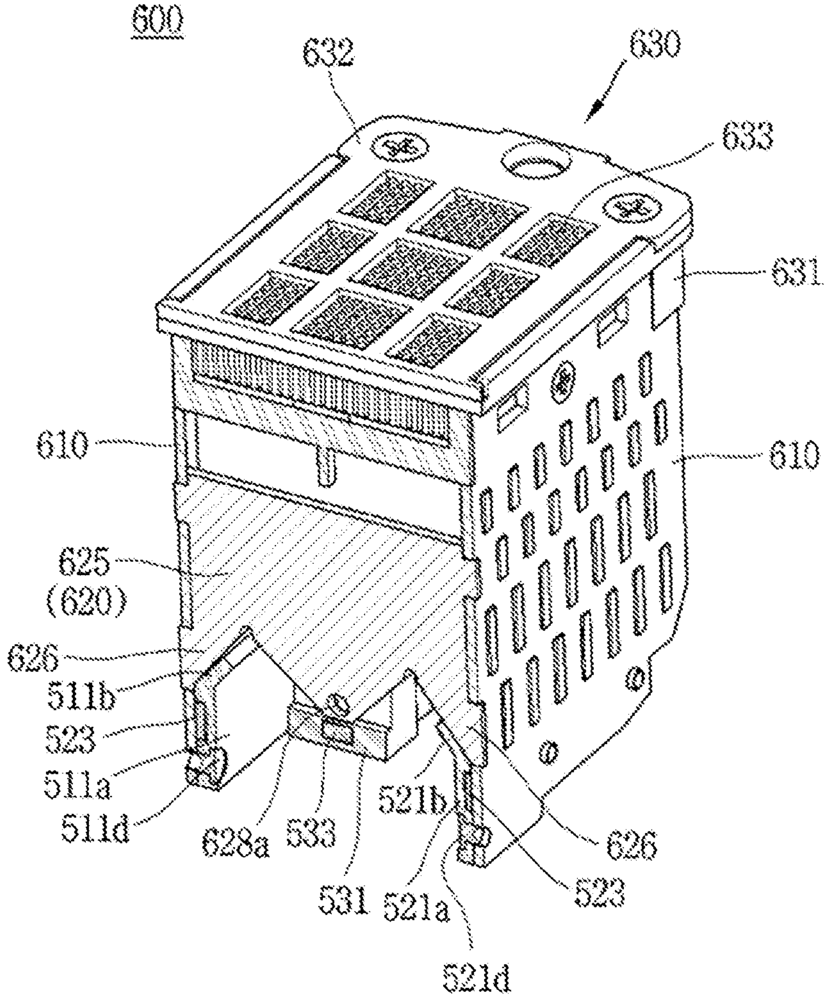
FIG. 17 is a perspective view illustrating a state in which the arc extinguishing unit shown in FIG. 6 is cut.

Specifically, as shown in FIG. 12, the third magnetic body of the third magnet unit 530 is disposed such that the first surface 533*a* is facing downward. That is, the third magnetic body forms a magnetic field area M.F.A in which magnetic flux descends downward and then rises upward. The arc generated in the magnetic field area M.F.A is subjected to a force of the magnetic field upward, that is, toward the arc extinguishing unit 600, by the third magnet unit 530.

(4) Description of the Insulators 525 and 535

Figure 21:
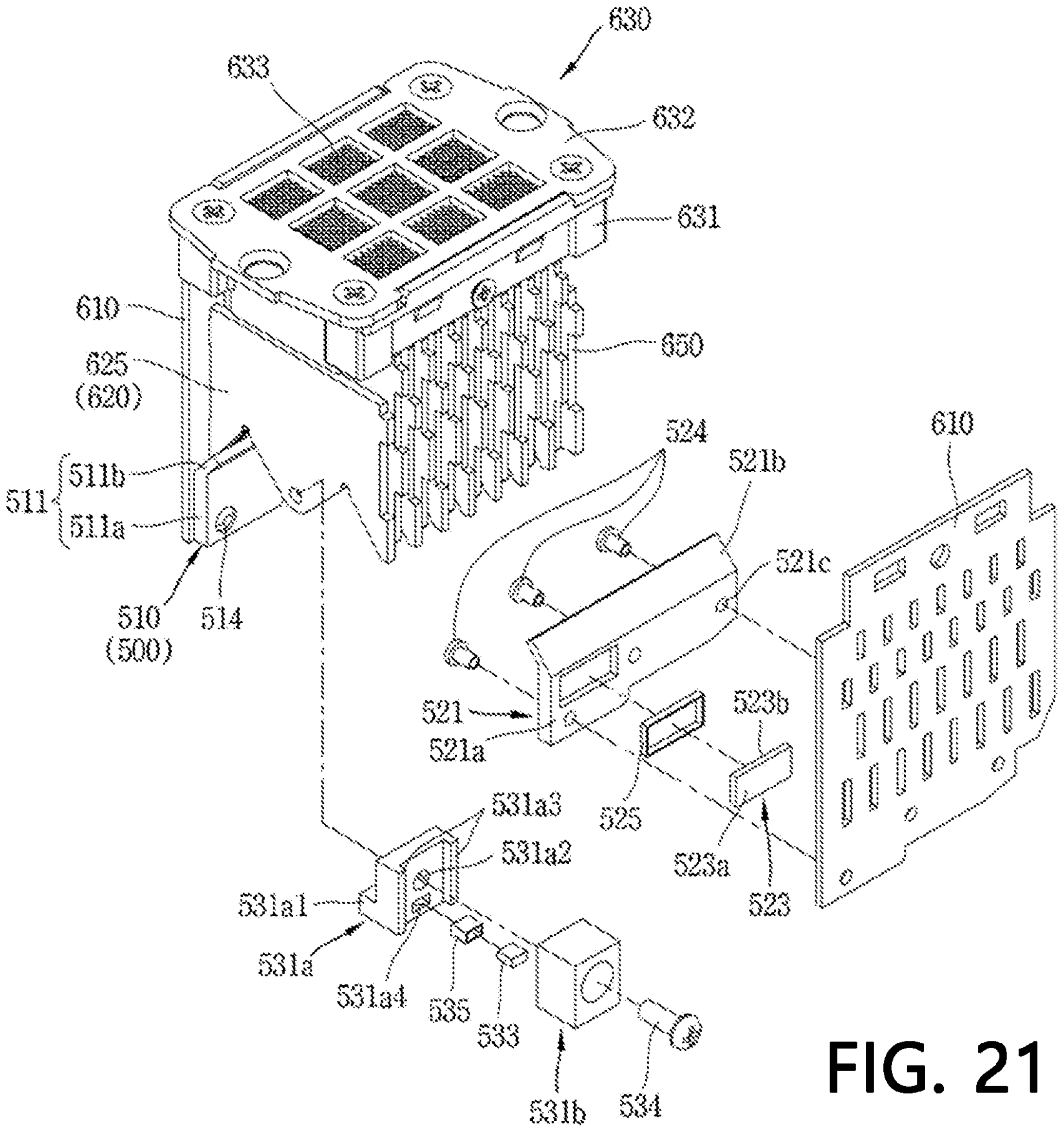
FIG. 21 is an exploded perspective view of an arc extinguishing unit according to another exemplary embodiment of the present disclosure.

Meanwhile, the arc extinguishing unit 600 according to another embodiment of the present disclosure may further include insulators 525 and 535 formed to surround the magnetic bodies 513, 523 and 533. Specifically, referring to FIG. 21, the magnet unit 500 may further include insulators 525 and 535 accommodated in the storage part and formed to surround the magnetic bodies 513, 523 and 533.

The insulator 525 and 535 may include a first insulator (not shown) interposed between the case 511 and 521 of the first magnet unit 510 and the first magnet body 513, and disposed to surround the first magnetic body 513; a second insulator 525 interposed between the case 521 of the second magnet unit 520 and the second magnetic body 523, and disposed to surround the second magnetic body 523; and a third insulator 535 interposed between the first case 531*a* of the third magnet unit 530 and the third magnetic body 533, and disposed to surround the third magnetic body 533.

The insulator 525 and 535 may reduce a deterioration phenomenon of the magnetic body disposed in the interior which may occur when the arc flows through the cases 511, 521, and 531 of the first magnet unit 510, the second magnet unit 520, and the third magnet unit 530.

4. Description of the Arc-Guided Path A.P According to an Embodiment of the Present Disclosure Referring to the drawings, a magnetic field formed in the magnetic field area M.F.A, an electromagnetic force applied to the arc, and the arc-guided path A.P will be described below.

In the following description, the part marked with "⊙" means that the current (arc) flows in a direction of coming out of the paper. In addition, the part marked with "ⓧ" means that the current (arc) flows in a direction of entering toward the paper.

The direction of the electromagnetic force received by the generated arc can be explained by Fleming's left-hand rule. According to Fleming's left-hand rule, when you point the third finger in the direction of the current (I) and the second finger in the direction of the magnetic field (B), the direction of the thumb is the direction of the electromagnetic force (F). Here, the angle between each finger should be a right angle.

At this time, according to Fleming's left-hand rule, the arc may move along the direction of the electromagnetic force received by the arc. This motion of the arc may be referred to as an arc-guided path (A.P).

Referring to FIGS. 12 and 18, the direction of the magnetic field M.F by the third magnet unit 530 in the magnetic field area M.F.A is upward. In this case, the third magnetic body included in the third magnet unit 530 may be a permanent magnet. Accordingly, the direction of the magnetic force lines applied to the magnetic field area M.F.A by the third magnet unit 530 is fixed.

FIG. 19 is a description of the electromagnetic force received by the corresponding arc when the arc is formed in a direction of entering toward the paper.

First, referring to FIG. 19(*a*), when the arc is formed in a direction of entering toward the paper, the magnetic field B by the third magnet unit 530 is formed upward, and thus according to Fleming's left-hand rule, the force received by the arc is directed to the right with respect to the drawing. Accordingly, the arc-guided path A.P is formed in the right direction, and the arc is moved in the right direction.

Referring to FIG. 19(*b*), as the arc moves to the right, a magnetic field M.F is formed by not only the third magnet unit 530 but also the second magnet unit 520. In this case, the magnetic field by the third magnet unit 530 is upward and leftward with respect to the drawing, and the direction of the magnetic field formed by the second magnet unit 520 is rightward and upward.

In this case, the direction of the net magnetic field by the second magnet unit 520 and the third magnet unit 530 is formed in a direction toward the third magnet unit 530. Therefore, according to Fleming's left-hand rule, the force received by the arc is directed to the right upward direction with respect to the drawing. Accordingly, the arc-guided path A.P is formed in the upper right direction, and the arc is moved in the upper right direction.

Referring to FIG. 19(*c*), a magnetic field is formed in the arc by the second magnet unit 520 and the third magnet unit 530. In this case, the direction of the net magnetic field applied to the arc is to the left.

Therefore, according to Fleming's left-hand rule, the force received by the arc is directed to the upward direction with respect to the drawing. Accordingly, the arc-guided path A.P is formed in the upward direction, and the arc is moved in the upward direction.

Since the arc moves in an upward direction, that is, toward the grid 620, the arc formed in the arc extinguishing unit 600 may be quickly applied to the grid 620 and be rapidly extinguished.

FIG. 20 is a description of the electromagnetic force received by the corresponding arc when the arc is formed in a direction of coming out of the paper.

First, referring to FIG. 20(*a*), when the arc is formed in a direction of coming out of the paper, the magnetic field B by the third magnet unit 530 is formed upward, and thus according to Fleming's left-hand rule, the force received by the arc is directed to the left with respect to the drawing. Accordingly, the arc-guided path A.P is formed in the left direction, and the arc is moved in the left direction.

Referring to FIG. 20(*b*), as the arc moves to the left, a magnetic field M.F is formed by not only the third magnet unit 530 but also the first magnet unit 510. In this case, the magnetic field by the third magnet unit 530 is upward and rightward with respect to the drawing, and the direction of the magnetic field formed by the first magnet unit 510 is leftward and upward.

In this case, the direction of the net magnetic field by the first magnet unit 510 and the third magnet unit 530 is formed in a direction toward the third magnet unit 530. Therefore, according to Fleming's left-hand rule, the force received by the arc is directed to the left upward direction with respect to the drawing. That is, the force received by the arc is in the upper left direction. Accordingly, the arc-guided path A.P is formed in the upper left direction, and the arc is moved in the upper left direction.

Referring to FIG. 20(*c*), a magnetic field is formed in the arc by the first magnet unit 510 and the third magnet unit 530. In this case, the direction of the net magnetic field applied to the arc is to the right.

Therefore, according to Fleming's left-hand rule, the force received by the arc is directed to the upward direction with respect to the drawing. Accordingly, the arc-guided path A.P is formed in the upward direction, and the arc is moved in the upward direction.

Since the arc moves in an upward direction, that is, toward the grid 620, the arc formed in the arc extinguishing unit 600 may be quickly applied to the grid 620 and be rapidly extinguished.

According to the arc extinguishing unit 600 according to an embodiment of the present disclosure, an arc-guided path A.P is formed by Fleming's left-hand rule, by the direction of the magnetic field of which an arc caused by a small current formed under the grid 620 of the arc extinguishing unit 600 is applied to a magnetic field M.F of a magnetic field area M.F.A formed by the first magnet unit to third magnet unit 510, 520, 530. The arc is moved along the arc-guided path A.P. As the arc moves, the arc may be quickly applied to the grid 620 and extinguished quickly.

Furthermore, according to the arc extinguishing unit 600 according to an embodiment of the present disclosure, in both cases where the direction of the arc formed in the arc extinguishing unit 600 is formed in a direction of entering toward the paper or in a direction of coming out of the paper, an arc-guided path A.P is formed in the upward direction.

Specifically, the arc is moved in the left or right direction according to the formation direction by the third magnet unit 530. Also, the arc moved in the left or right direction is guided upward by the first magnet unit 510 or the second magnet unit 520.

That is, the arc extinguishing unit 600 according to an embodiment of the present disclosure can quickly extinguish the arc by guiding and moving the arc to the grid 620 by the first magnet unit 510, the second magnet unit 520 and the third magnet unit 530 regardless of the direction of the arc generated.

5. Description of the Protruding Contact 322

Figure 22:
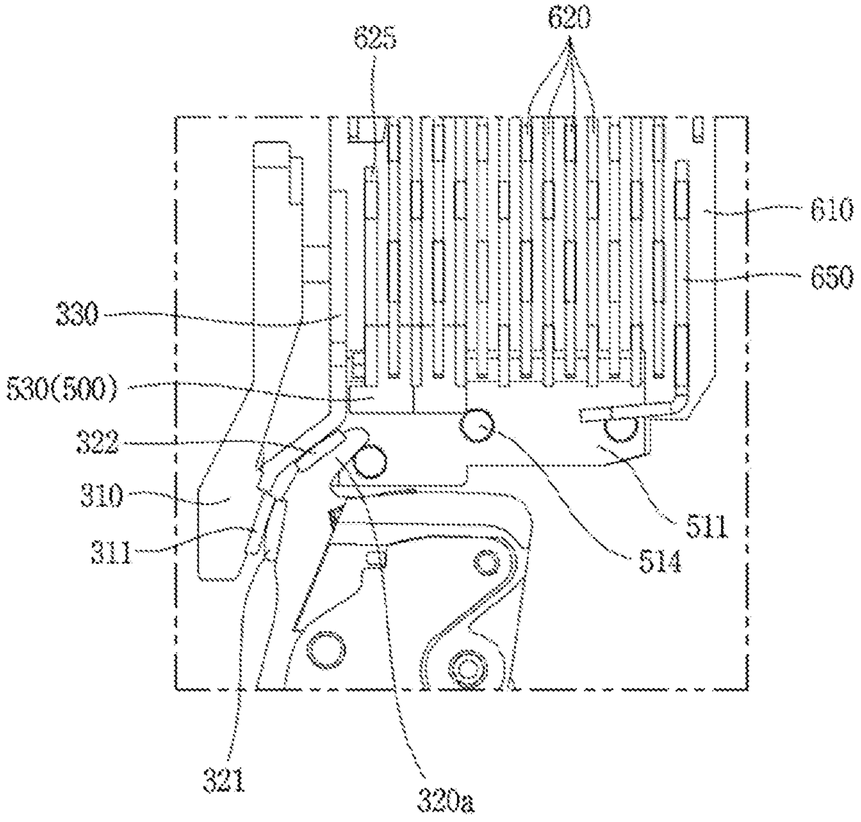
FIGS. 22 to 24 are diagrams for explaining an area where an arc is generated and a space where a magnetic field is formed by a magnet unit in an air circuit breaker according to an exemplary embodiment of the present disclosure.
Figure 23:
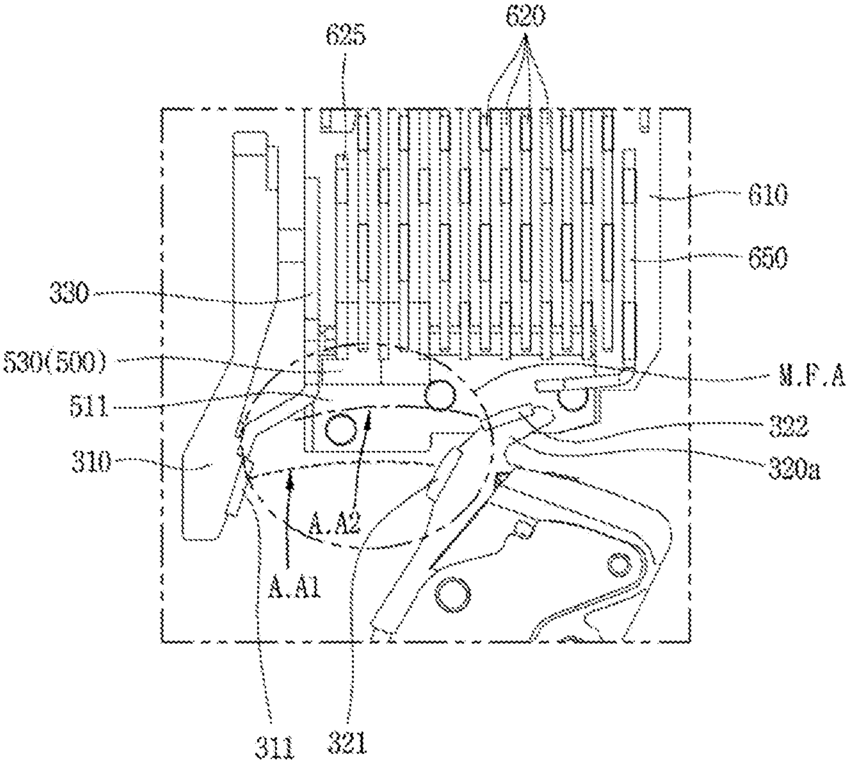
Figure 24:
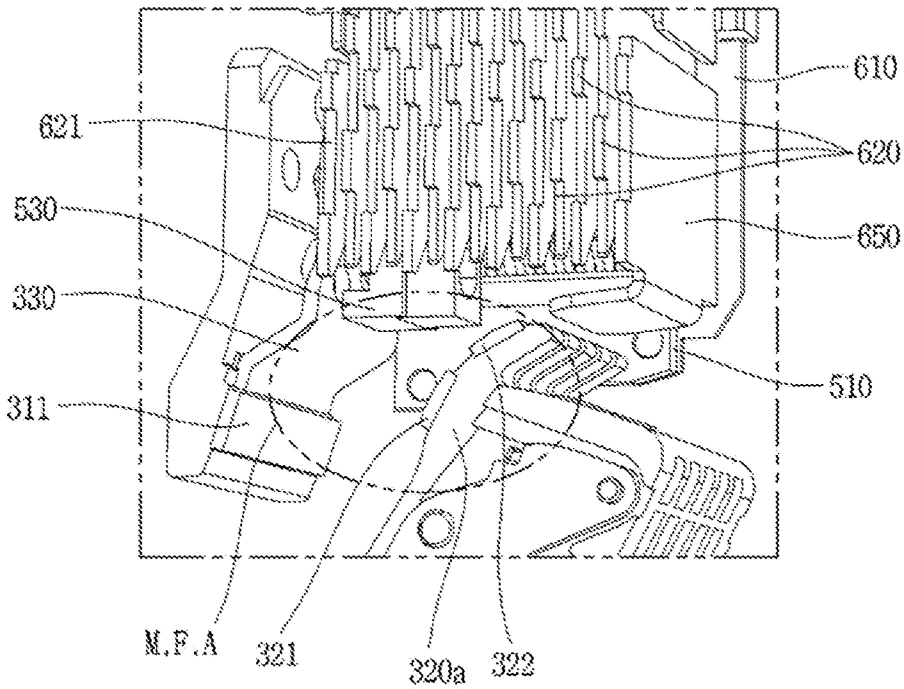

Referring to FIGS. 22 to 24, the circuit breaking unit 300 according to an embodiment of the present disclosure may further include a movable contact terminal 320 and a protruding contact 322.

The movable contact terminal 320 may include an extension portion 320*a* in which the movable contact 321 is disposed and at least a portion thereof extends upward. Specifically, referring to FIG. 22, at least a portion of the movable contact terminal 320 may extend upward.

The protruding contact 322 may be disposed on the extension portion 320*a* to be spaced apart from the movable contact 321. In this case, the protruding contact 322 may be disposed to contact the low runner 330 while the movable contact 321 is in contact with the fixed contact 311.

As the protruding contact 322 and the low runner 330 are in contact with each other, and thus, there may be energized between the protruding contact 322 and the low runner 330. In addition, when the movable contact 321 and the fixed contact 311 are spaced apart from each other, the protruding contact 322 and the low runner 330 are also spaced apart from each other, and during this process, an arc may be generated between the protruding contact 322 and the low runner 330.

In the present embodiment, the arc-generation area includes a first arc-generation area A.A1 and a second arc-generation area A.A2. The first arc-generation area A.A1 is formed between the fixed contact 311 and the movable contact 321. The second arc-generation area A.A2 is formed between the protruding contact 322 and the low runner 330. The low runner 330 may play the same role as the fixed contact 311 in relation to the protruding contact 322. Thus, the second arc-generation area A.A2 may be formed between the protruding contact 322 and the low runner 330.

In this case, since the protruding contact 322 is disposed above the movable contact 321 on the movable contact terminal 320, when the movable contact 321 is separated from the fixed contact 311, it is also separated from the low runner 330. However, in another embodiment, the protruding contact 322 and the low runner 330 may be separated from each other a very short moment later than when the movable contact 321 and the fixed contact 311 are separated.

Specifically, when the trip mechanism of the movable contact terminal 320 occurs to separate the movable contact 321 from the fixed contact 311, the movable contact 321 and the fixed contact 311 may be first separated with a very short time difference, and then the protruding contact 322 and the low runner 330 may be separated.

That is, when the circuit breaking unit 300 performs the trip mechanism, the protruding contact 322 and the lower runner 330 are separated later in time than the movable contact 321 and the fixed contact 311, and thus even after energization is cut off between the movable contact 321 and the fixed contact 311, energization occurs between the protruding contact 322 and the low runner 330 for a short time.

Accordingly, when the circuit breaking unit 300 is tripped, the probability of generating an arc in the second arc-generation area A.A2 generated between the protruding contact 322 and the low runner 330 becomes very higher than the probability of generating an arc in the first arc-generation area A.A1 generated between the movable contact 321 and the fixed contact 311.

Therefore, according to an embodiment of the present disclosure, by providing the low runner 330 and the protruding contact 322, there is an effect that the location where the arc is generated is moved upward. That is, according to an embodiment of the present disclosure, there is an effect that an area where an arc is generated is moved upward by a distance in which the protruding contact 322 protrudes upward from the movable contact 321.

Figure 25:
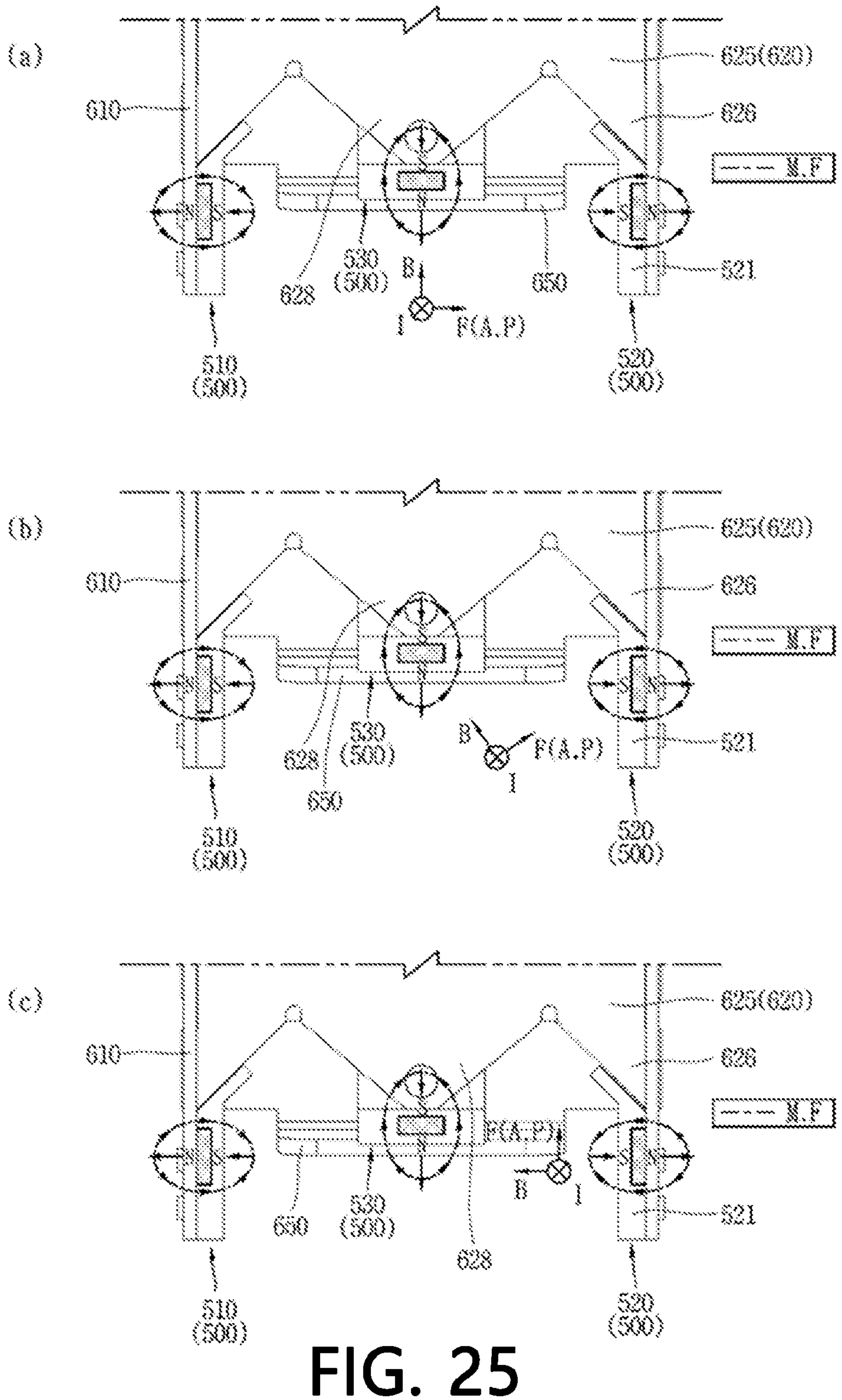
FIGS. 25 and 26 are conceptual diagrams illustrating electromagnetic force received by an arc by an arc extinguishing unit according to another exemplary embodiment of the present disclosure.
Figure 26:
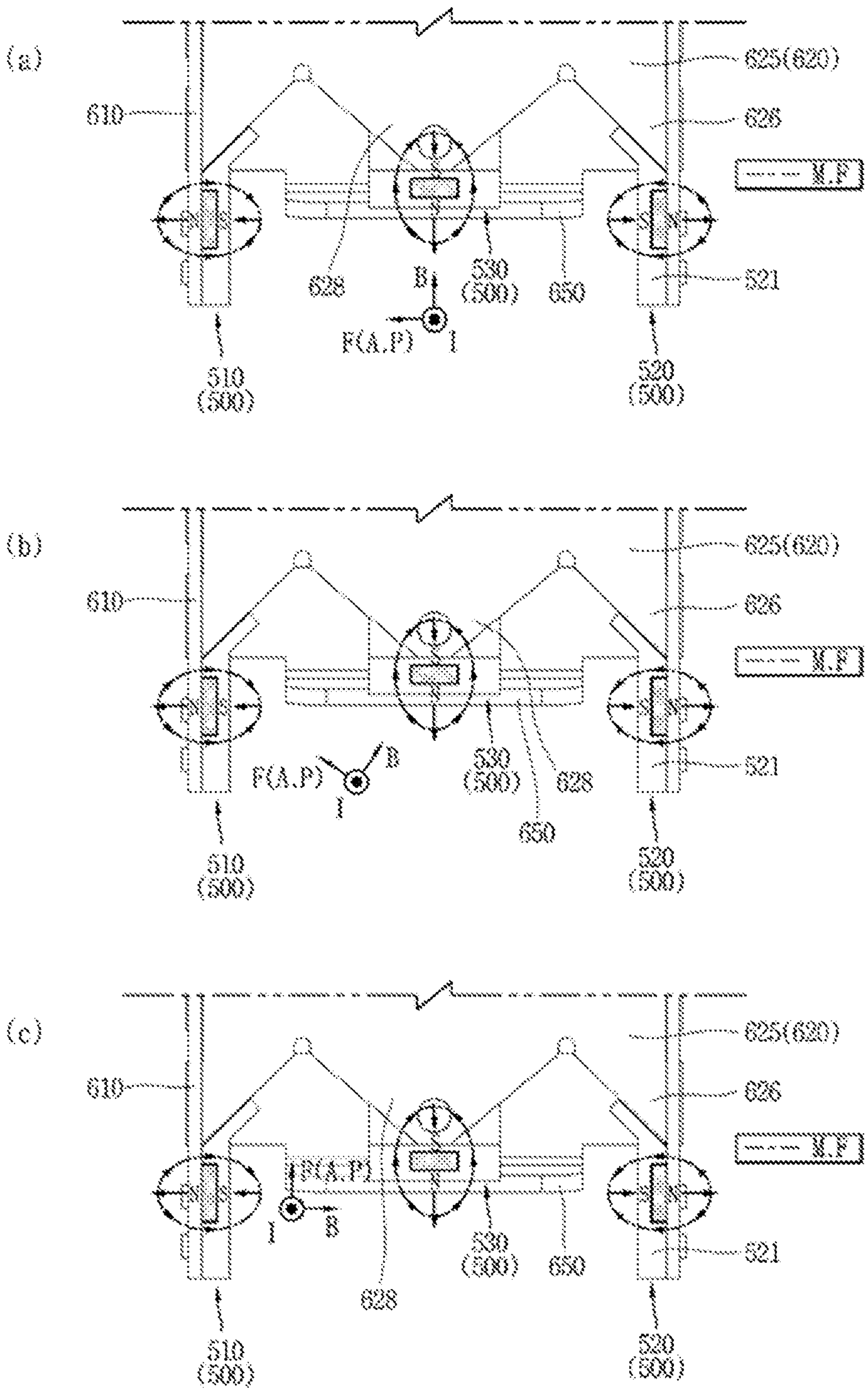

Specifically, referring to FIGS. 25 and 26, the location where the arc is generated is higher than that of the embodiment without the protruding contact 322.

Accordingly, since the magnetic field applied to the arc by the first magnet unit 510, the second magnet unit 520, and the third magnet unit 530 increases, the electromagnetic force at which the arc is moved upward can be more strongly applied.

In addition, since the distance between the generated arc and the grid decreases, the time at which the arc is applied to the grid decreases, and thus the arc can be quickly extinguished.

Although the above has been described with reference to preferred embodiments of the present disclosure, it will be understood that those skilled in the art can variously modify and change the present disclosure without departing from the idea and scope of the present disclosure described in the claims below.

What is claimed is:

1. An arc extinguishing unit, comprising:

two side plates spaced apart from each other and disposed to face each other;

a plurality of grid plates disposed between the two side plates, spaced apart from each other, and coupled to the two side plates, respectively, and including a first outermost grid plate and a second outermost grid plate between which a remainder of the plurality of grid plates is disposed; and a magnet unit forming a magnetic field for changing a path of an arc formed between a fixed contact and a movable contact disposed to be spaced apart from the fixed contact, and disposed adjacent to the first outermost grid plate adjacent to the fixed contact among the plurality of grid plates, wherein the magnet unit comprises:

a first magnet unit coupled to a first one of the two side plates and extending in a direction in which the plurality of grid plates coupled to the two side plates are aligned;

a second magnet unit coupled to a second one of the two side plates and disposed at a position corresponding to the first magnet unit; and a third magnet unit coupled to the first outermost grid plate, wherein the third magnet unit comprises:

a case formed to define a storage part therein and coupled to the first outermost grid plate or the two side plates;

a magnetic body accommodated in the storage part and configured to form the magnetic field; and a coupling member for coupling the case to a coupling groove formed in the first outermost grid plate.

2. The arc extinguishing unit of claim 1, wherein the magnet unit is disposed symmetrically with respect to a central portion of the first outermost grid plate disposed between the two side plates.

3. The arc extinguishing unit of claim 2, wherein the magnet unit is disposed on at least one of the two side plates or the first outermost grid plate.

4. The arc extinguishing unit of claim 1, wherein the magnet unit further comprises an insulator accommodated in the storage part and formed to surround the magnetic body.

5. The arc extinguishing unit of claim 4, wherein the case guides the arc such that the arc generated flows toward the first outermost grid plate.

6. The arc extinguishing unit of claim 1, wherein the case comprises:

a first case having a case storage part capable of accommodating the magnetic body on a rear surface; and a second case coupled to the first case through the coupling member on the rear surface of the first case, and wherein the first case comprises a protruding portion formed at a bottom of a front surface to be in contact with a bottom of at least one grid plate of the plurality of grid plates.

7. The arc extinguishing unit of claim 6, wherein wing portions protrude from opposite sides of the rear surface of the first case protruding along a direction intersecting the rear surface, and the second case is inserted and fixed between the wing portions.

8. The arc extinguishing unit of claim 1, wherein the magnetic body of the first magnet unit and the second magnet unit each comprises a first surface and a second surface, wherein:

the first surface is magnetized to a North pole; and the second surface is magnetized to a South pole; and wherein the first surface is disposed along a direction in which the first magnet unit and the second magnet unit are away from each other.

9. The arc extinguishing unit of claim 1, wherein the magnetic body of the third magnet unit comprises a first surface and a second surface, wherein:

the first surface is magnetized to a North pole; and the second surface is magnetized to a South pole; and wherein the first surface is disposed toward a space through which the movable contact passes when the fixed contact and the movable contact are separated from each other.

10. The arc extinguishing unit of claim 1, wherein the third magnet unit is coupled to the first outermost grid plate.

11. The arc extinguishing unit of claim 10, wherein a coupling leg protruding in a direction away from the arc from an end of a center of the first outermost grid plate is formed in the first outermost grid plate.

12. The arc extinguishing unit of claim 11, wherein the first outermost grid plate further comprises a grid leg formed to be spaced apart from opposite sides of the coupling leg, and protruding in the direction away from the arc; and wherein a concave groove is formed between the grid leg and the coupling leg.

13. An air circuit breaker, comprising:

a fixed contact;

a movable contact moved in a direction toward or away from the fixed contact; and an arc extinguishing unit positioned adjacent to the fixed contact and the movable contact, and configured to extinguish an arc generated when the fixed contact and the movable contact are spaced apart, wherein the arc extinguishing unit comprises:

two side plates spaced apart from each other and disposed to face each other;

a plurality of grid plates disposed between the two side plates, spaced apart from each other, and coupled to the two side plates, respectively, including a first outermost grid plate and a second outermost grid plate between which a remainder of the plurality of grid plates is disposed; and a magnet unit forming a magnetic field for changing a path of the arc formed between the fixed contact and the movable contact, and disposed adjacent to the first outermost grid plate adjacent to the fixed contact among the plurality of grid plates, wherein the magnet unit comprises:

a first magnet unit coupled to a first side plate of the two side plates and extending in a direction in which the plurality of grid plates coupled to the two side plates are aligned;

a second magnet unit coupled to a second side plate of the two side plates and disposed at a position corresponding to the first magnet unit; and a third magnet unit coupled to the first outermost grid plate, wherein the third magnet unit comprises:

a case formed to define a storage part therein and coupled to the first outermost grid plate or the two side plates;

a magnetic body accommodated in the storage part and configured to form the magnetic field; and a coupling member for coupling the case to a coupling groove formed in the first outermost grid plate.

14. The air circuit breaker of claim 13, further comprising:

an arc runner protruding from the fixed contact toward the arc extinguishing unit; and a protruding contact protruding from the movable contact toward the fixed contact and contacting the arc runner when the movable contact contacts the fixed contact.

* * * * *